United States Patent
Gray et al.

(10) Patent No.: US 9,470,437 B2
(45) Date of Patent: Oct. 18, 2016

(54) MAGNETOTHERMAL PUMP DEVICE AND METHOD OF OPERATION

(71) Applicant: Prime Photonics, Blacksburg, VA (US)

(72) Inventors: David Todd Gray, Blacksburg, VA (US); John Moore Coggin, Blacksburg, VA (US)

(73) Assignee: Prime Photonics, LC, Blacksburg, VA (US)

( * ) Notice: Subject to any disclaimer, the term of this patent is extended or adjusted under 35 U.S.C. 154(b) by 174 days.

(21) Appl. No.: 14/303,648

(22) Filed: Jun. 13, 2014

(65) Prior Publication Data
US 2014/0366558 A1    Dec. 18, 2014

Related U.S. Application Data

(60) Provisional application No. 61/835,882, filed on Jun. 17, 2013.

(51) Int. Cl.
F25B 21/00    (2006.01)
(52) U.S. Cl.
CPC .......... *F25B 21/00* (2013.01); *F25B 2321/002* (2013.01); *Y02B 30/66* (2013.01)
(58) Field of Classification Search
CPC . F21B 21/00; Y02B 30/66; F25B 2321/0021
USPC .................................................. 62/3.1, 259.2
See application file for complete search history.

(56) References Cited

U.S. PATENT DOCUMENTS

| 3,664,881 A | 5/1972 | Love |
| 7,800,278 B2 | 9/2010 | Ujihara et al. |
| 2007/0205854 A1* | 9/2007 | Kazadi ............... F16C 32/0429 335/306 |
| 2013/0141091 A1* | 6/2013 | Delaet ................. G01R 33/095 324/252 |

FOREIGN PATENT DOCUMENTS

WO    2007087383 A2    8/2007

OTHER PUBLICATIONS

A. Yu et al., "Graphite Nanoplatelet-Epoxy Composite Thermal Interface Materials," J. Phys. Chem. C, vol. 111, No. 21, p. 7565-7569, 2007, 5 pages.

(Continued)

*Primary Examiner* — Melvin Jones
(74) *Attorney, Agent, or Firm* — New River Valley IP Law, PC; Michele L. Mayberry

(57) ABSTRACT

Magnetothermal pump devices are provided. Such devices can operate on the principle of thermally induced switching between open and closed states of a magnetic switch to generate mechanical oscillations. Exemplary devices provided include a thermal gradient and a magnet with a Curie temperature at or within this gradient. When the soft magnet is below the Curie temperature, it has sufficient magnetic force to bind a hard magnet at the hot side of the gradient. Heating of the magnet at the hot side causes it to exceed its Curie temperature, resulting in loss of magnetic attraction. At this stage, a restorative force exceeds the magnetic force, causing the magnet to shift to the cold side of the gradient, which oscillations can be used to pump fluid. Any magnetic transition that results in a change in the vector nature of the magnetic moment of the soft magnetic material can be employed.

20 Claims, 16 Drawing Sheets

(56) References Cited

OTHER PUBLICATIONS

B. Yang and Q. Lin, "Planar micro-check valves exploiting large polymer compliance," Sensors and Actuators A, No. 134, p. 186-193, 2007.
C. Zhao and T. Lu, "Analysis of microchannel heat sinks for electronics cooling," International Journal of Heat and Mass Transfer, No. 45, pp. 4857-4869, 2002.
D. D. L. Chung, "Thermal interface materials," Journal of Materials Engineering and Performance, vol. 10, No. 1, pp. 56-59, 2001.
F. K. Forster et al., "Designing High-Performance Micro-Pumps Based on No-Moving Parts Valves," MEMS DSC, vol. 62, pp. 47-53, 1997.
F. K. Forster, R. L. Bardell, N. R. Sharma, R. J. Penney and M. A. Afromowitz, "Transport of Particle-Laden Fluids Through Fixed-Valve Micropumps," MEMS, vol. 1, 1999.
M. Mochizuki, Y. Sajtoy, T. Nguyen, T. Nguyen, V. Wuttijumnong, Y. Horiuchi, R. Tacomkang, R. Singh and A. Akbarzadeh, "Development of miniature loop heat pipes for the thermal control of laptops," in ASME 2008 First International Conference on Micro/Nanoscale Heat Transfer, Tainan, Taiwan, Jan. 6-9, 2008.
M. Ujihara, G. Carman, D. Lee, "Thermal energy harvesting device using ferromagnetic materials," Applied Physics Letters, vol. 91, No. 9, p. 093508, 2007.

R. Rullière et al., "Prediction of the maximum heat transfer capability of two-phase heat spreaders—Experimental validation," International Journal of Heat and Mass Transfer, vol. 50, No. 7-8, p. 1255-1262, 2007, 8 pages.
R. Singh, A. Akbarzadeh, and M. Mochizuki, "Thermal Potential of Flat Evaporator Miniature Loop Heat Pipes for Notebook Cooling," IEEE Transactions on Components and Packaging Technologies, vol. 33, No. 1, Mar. 2010, pp. 32-45.
S. H. Winoto, "A New No Moving Parts Micro Valve," Engineering Research, National University of Singapore, vol. 25, No. 1, 2010.
S. V. Garimella, A. S. Fleisher, J. Y. Murthy, A. Keshavarzi and R. Prasher, "Thermal Challenges in Next-Generation Electronic Systems," IEEE Components, Packaging, and Manufacturing Technology Society, vol. 31, No. 4, pp. 801-815, 2008.
S.C. Wu et al., "Investigation of the effect of heat leak in loop heat pipes with flat evaporator," in Microsystems, Packaging, Assembly and Circuits Technology Conference, Taipei, 2009, 4 pages.
Thermacore, Inc., "Heat Pipe Technology: Passive Heat Transfer for Greater Efficiency," 2012. [Online]. Available: http://www.thermacore.com/thermal-basics/heat-pipe-technology.aspx. [Accessed Jun. 2012].
V. Pastukhov et al., "Miniature loop heat pipes for electronics cooling," Applied Thermal Engineering, No. 23, pp. 1125-1135, 2003, 11 pages.

* cited by examiner

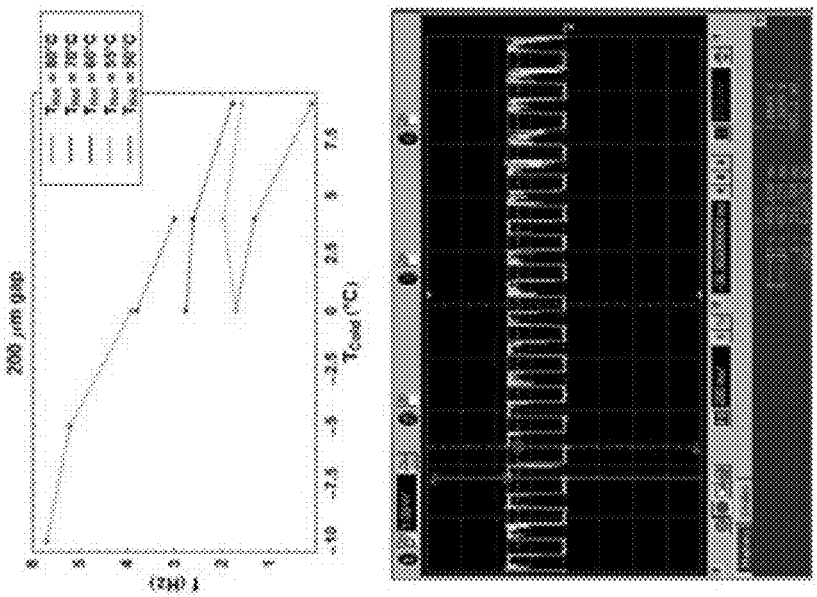
FIG. 12B
FIG. 12C
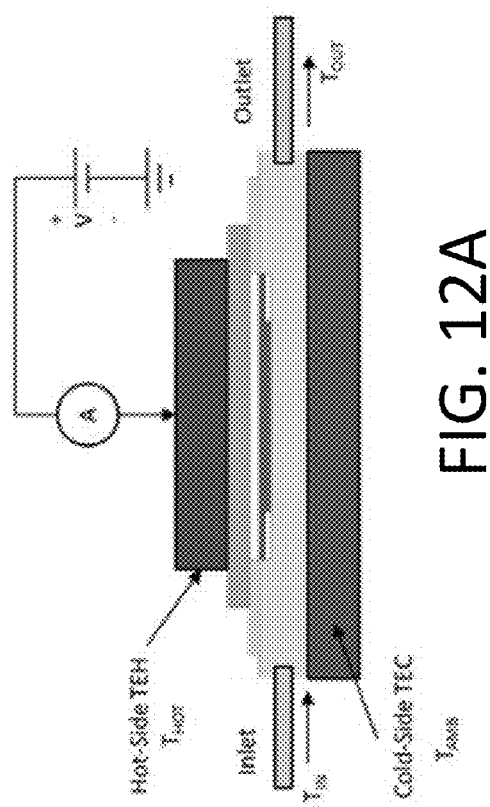
FIG. 12A

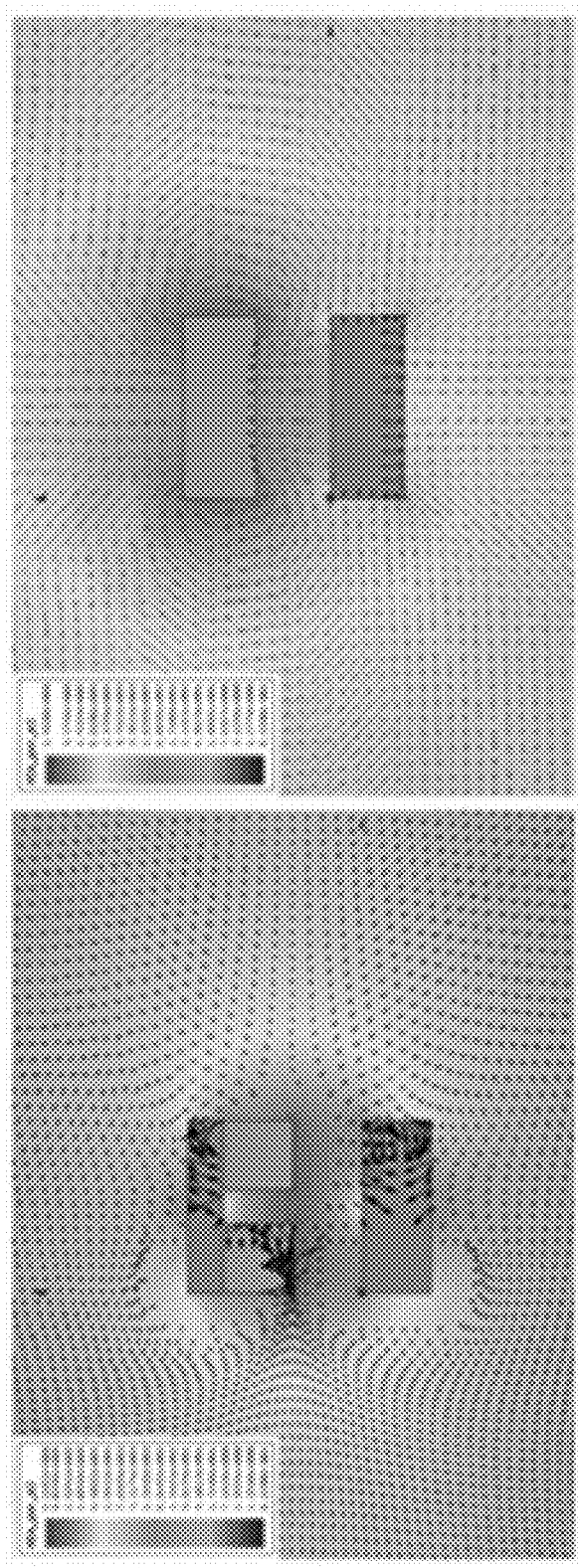

MAGNETOTHERMAL PUMP DEVICE AND METHOD OF OPERATION

CROSS-REFERENCE TO RELATED APPLICATIONS

The present application relies on the disclosure of and claims priority to and the benefit of the filing date of U.S. Provisional Application No. 61/835,882, filed Jun. 17, 2013, the disclosure of which is hereby incorporated by reference herein in its entirety.

BACKGROUND OF THE INVENTION

1. Field of the Invention

The present invention is related to the transduction of thermal energy to mechanical energy. More particularly, the present invention relates to a pump device and method of operation based on such transduction through the mechanical oscillation of a magnetic material within a thermal gradient.

2. Description of Related Art

Many inventions and significant research show the vast efforts to meaningfully harvest waste thermal energy. In some cases, excess thermal energy is simply removed to provide for lower operational temperatures of systems or components. This active cooling can sometimes achieve a net gain in system efficiency (e.g. active cooling of concentrated solar cells), but ultimately requires the input of adequate energy, such as that needed to move a cooling fluid. Other research has focused on the conversion of thermal energy into electrical energy that may be used instantaneously, or stored in batteries or capacitors for later use. Thermoelectric Peltier or Seebeck effect devices operate to harvest electricity from thermal gradients, as do magneto-thermoelectric generators (see M. Ujiraha, G. Carman, D. Lee, "Thermal energy harvesting device using ferromagnetic materials," Applied Physics Letters, vol. 91, no. 9, p. 093508, 2007).

Although significant effort has been made to improve conversion efficiency in thermal energy scavenging systems, the cascaded transduction topologies (thermal to mechanical to electrical) incur efficiency losses at each transduction stage. Furthermore, although storage of electrical energy facilitates advanced functionality of devices, both capacitor-based and battery-based electrical storage systems enable parasitic energy loss through system imperfections.

Thermal management is one of the key challenges in 21st century technologies. Higher temperatures, which degrade critical components and reduce performance, are beginning to bottleneck the design and operation of smaller and higher performance systems. Thermal management is a ubiquitous problem, with issues from cooling system noise and reliability in military applications to size and performance in laptops and gaming systems to near-prohibitive energy costs in data centers.

Although there exists a host of thermal management techniques, including heat pipes, liquid immersion, jet impingement and sprays, thermoelectric coolers, and refrigeration, these techniques often incur large penalties in terms of weight, power, or volume. The advantages and disadvantages of these techniques will be described in more detail below.

Alternative Thermal Management Techniques. Heat pipes are an extremely attractive thermal transport solution which hold promise to handle heat fluxes up to 1 kW/cm$^2$. Miniature loop heat pipes can have thermal conductivities more than 10 times that of commonly used metals (see C. Zhao and T. Lu, "Analysis of microchannel heat sinks for electronics cooling," International Journal of Heat and Mass Transfer, no. 45, pp. 4857-4869, 2002) and larger heat pipes can have thermal conductivities up to 100 times greater. Heat pipes are also passive, with no moving parts or external energy source required.

However, several key issues limit flexibility and greatly increase the cost and complexity of heat pipe design and manufacture. All heat pipes must be vacuum sealed to prevent leakage of vapor. Heat pipes also need to use one of several methods to return the liquid phase back to the heat source. These methods include expensive and inflexible wick structures that can be problematic for curved geometries, an added device component, or a gravitational return design which further limits the geometrical and placement options. Also present in heat pipes of all sizes are issues related to the evaporator design: cylindrical loop heat pipes have compatibility issues with both flat evaporators and saddled evaporators which raise thermal resistance, worsen the heat leak problem, and can prevent isothermal evaporator operation (see S.-C. Wu, J.-C. Peng, S.-R. Lai, C.-C. Yeh and Y.-M. Chen, "Investigation of the effect of heat leak in loop heat pipes with flat evaporator," in Microsystems, Packaging, Assembly and Circuits Technology Conference, Taipei, 2009).

Extra design complications arise when trying to design microscale heat pipes (see V. Pastukhov, Y. Maidanik, C. Vershinin and M. Korukov, "Miniature loop heat pipes for electronics cooling," Applied Thermal Engineering, no. 23, pp. 1125-1135, 2003), as the fluid fill ratios must be very precise, especially in high heat flux applications (see S. V. Garimella, A. S. Fleisher, J. Y. Murthy, A. Keshavarzi and R. Prasher, "Thermal Challenges in Next-Generation Electronic Systems," IEEE Components, Packaging, and Manufacturing Technology Society, vol. 31, no. 4, pp. 801-815, 2008). Finally, miniature and micro heat pipes are often limited to axial transportation of heat over a relatively short distance, restricting the placement of hot- and cold-side exchangers.

With the dimensions and space considerations of the electronics systems in the OHIO class sub, it is likely that a miniature loop heat pipe would be necessary. Recent heat pipes that can handle heat fluxes of 50 W/cm$^2$ have been fabricated (see M. Mochizuki, Y. Sajtoy, T. Nguyen, T. Nguyen, V. Wuttijumnong, Y. Horiuchi, R. Tacomkang, R. Singh and A. Akbarzadeh, "Development of miniature loop heat pipes for the thermal control of laptops," in ASME 2008 First International Conference on Micro/Nanoscale Heat Transfer, Tainan, Taiwan, 6-9 Jan. 2008), which means that the use of several pipes would be necessary to meet the desired cooling loads. While heat pipes are extremely well suited to many applications, they are not ideal when developing solutions for scalability and adaptability or when cost is a key consideration. With the aforementioned design and theoretical complications associated with miniature and micro heat pipes, implementation of these heat pipes at the current state of performance adds severe design complications.

Solid-state passive heat transfer devices. Advanced heat sinks, heat spreaders, and advanced thermal interface materials are typically discussed as methods of passive or assisted electronics cooling. These methods enhance the heat transfer characteristics of the thermal management system through the use geometric designs to maximize surface area or advanced materials to minimize thermal resistance of the system. They are typically used in conjunction with other methods, such as heat sinks and forced air cooling. Each of these devices have potential for use in conjunction with the magnetothermal device of this disclosure.

Heat sinks are passive devices with structural geometries optimized for dissipation of heat into a working fluid which flows through the channels. Heat sinks are typically metals with high thermal conductivity and finned sink-side geometries. These geometries create a large surface area to dissipate large thermal loads. The heat sink is fixed to the electronic component, and transfers the thermal energy into a working fluid. Water-cooled microchannel heat sinks have demonstrated that a heat flux as high as 790 W/cm$^2$ could be dissipated (see C. Zhao and T. Lu, "Analysis of microchannel heat sinks for electronics cooling," International Journal of Heat and Mass Transfer, no. 45, pp. 4857-4869, 2002). As these components are passive, a method of forced circulation is usually necessary. Heat sinks can be integrated into most designs at the hot side and cold side reservoir.

Heat spreaders are another type of heat exchanger which typically function to reduce areas of high heat flux. This allows uniform efficiency in a device which cannot manage the high heat flux of a specific location but can manage total thermal loads. Improvements in heat spreaders have been cited as a potentially useful method for handling high thermal loads (see S. V. Garimella, A. S. Fleisher, J. Y. Murthy, A. Keshavarzi and R. Prasher, "Thermal Challenges in Next-Generation Electronic Systems," IEEE Components, Packaging, and Manufacturing Technology Society, vol. 31, no. 4, pp. 801-815, 2008). Two phase heat spreaders have demonstrated temperature variation of less than 2° C. across a 170 cm$^2$ area (see R. Rullière, F. Lefèvre and M. Lallemand, "Prediction of the maximum heat transfer capability of two-phase heatspreaders—Experimental validation," International Journal of Heat and Mass Transfer, vol. 50, no. 7-8, p. 1255-1262, 2007). The high degree of uniformity allows for many other potential solutions to be utilized.

Thermal interface materials (TIMs) are usually inserted between components and heat sinks in order to provide adequate thermal contact between the source and heat removal device. Common TIM conductance ranges from 7 W/m$^2$·K with no TIM up to 208 kW/m$^2$·K with solder (see D. D. L. Chung, "Thermal interface materials," Journal of Materials Engineering and Performance, vol. 10, no. 1, pp. 56-59, 2001). The TIM would be the limiting factor in many high heat flux devices. Research into nanostructured TIMs has suggested that graphene filler can enhance thermal conductivity of an epoxy by 3000% (see A. Yu, P. Ramesh, M. E. Itkis, E. Bekyarova and R. C. Haddon, "Graphite Nanoplatelet-Epoxy Composite Thermal Interface Materials," J. Phys. Chem. C, vol. 111, no. 21, p. 7565-7569, 2007) and that macroscale geometries of nanomaterials are a potentially viable option for a thermal interface material (see S. V. Garimella, A. S. Fleisher, J. Y. Murthy, A. Keshavarzi and R. Prasher, "Thermal Challenges in Next-Generation Electronic Systems," IEEE Components, Packaging, and Manufacturing Technology Society, vol. 31, no. 4, pp. 801-815, 2008).

Thus, there is a need in the art for improved technologies for harvesting and managing waste thermal energy.

SUMMARY OF THE INVENTION

Embodiments of the present disclosure address these issues with an innovative new method and device for autonomic, self-powered cooling. The present disclosure provides an autonomic, self-powered, scalable fluid pump device system to quietly, reliably, and efficiently cool systems, for example, electronic systems, by scavenging waste thermal energy with an innovative magnetothermal (MT) heat pump device. Rather than operating through an inefficient thermal-to-mechanical-to-electrical cascaded conversion mechanism, embodiments of the present disclosure convert thermal energy into mechanical oscillations that will be used directly to drive a fluid pump. The resulting circulation of a working fluid through heat exchangers allows for management of excess heat from critical systems. The thermo-mechanical transduction mechanism responds to increased thermal gradients with increased device power, providing an autonomous, dynamic response to varying thermal loads without the consumption of mission-critical energy supplies.

Through direct conversion of excess thermal energy into mechanical energy, embodiments of the present disclosure overcome the limitations of many alternative thermal management techniques. In the simplest implementation, embodiments of the present disclosure allow for supplemental thermal transport through circulation of a working fluid through heat exchangers. Embodiments of the disclosure are flexible enough to allow for a wide range of coolants—from simple air coolant, to a more robust water-based cooling, or even advanced high-heat capacity working fluids. Embodiments of the disclosure provide thermal-to-mechanical transduction which allows for working fluid compression, enabling a passive, refrigerated cooling system that results in sub-ambient cooling capabilities or hydraulic pressure reservoirs.

Finite difference models suggest a mechanical energy density of roughly 180 mJ/m$^2$ for a magnetothermal oscillator operating at 2 Hz. Incorporation of second-generation nonlinear springs and implementation of a quasi-closed magnet circuit results in an order of magnitude increase in mechanical energy. Optimization of internal interfacial thermal conductivity will afford a factor of ten increase in operation frequency, boosting performance into the 20-30 Hz range. With water as the device working fluid, it is estimated that with a device head of 1 meter a heat flux capacity of 150-180 kW/m$^2$ can be obtained.

Embodiments of the present disclosure finds root in Magneto-Thermoelectric Generator (MTG) technologies—a device that converts thermal energy into mechanical oscillations, and subsequently generates electrical energy from the oscillations. Both devices leverage the temperature dependence of magnetic properties in ferromagnetic materials. In the present disclosure, mechanical oscillations drive fluid devices and compressors, bypassing relatively inefficient electrical conversion typical of most piezoelectric-based energy harvesters.

Embodiments of the present disclosure have a variety of applications ranging from coolant circulation, self-powered chip cooling, and passive pumping for microvascular networks. Other embodiments include pressurization systems that result in self-powered refrigeration for sub-ambient cooling of hydraulic pressure reservoirs. An additional embodiment of the present disclosure is a low-cost, mass producible, thermally driven device that may be used as component of a cooling system for a NASA Orion-type vehicle.

The present disclosure overcomes many of the problems associated with either active cooling or thermoelectric energy harvesting systems. Through a direct thermomechanical transduction mechanism, and direct, instantaneous use of the generated mechanical energy, the pump device allows for both passive cooling and efficient thermal to mechanical energy transduction.

Harvesting electrical energy from thermal gradients is a useful tool for numerous applications—from large scale waste heat recovery to small-scale, self-powered sensors, especially for solar aircraft applications. Increasing the efficiency of traditional bulk thermoelectric generators (TEG) has been the subject of much development for 30-40 years, yet efficiency improvements for commercially viable devices have been marginal, at best. The Magneto-thermoelectric generator (MTG) developed in previous work has the potential for higher energy densities than today's TEGs (see M. Ujiraha, G. Carman, D. Lee, "Thermal energy harvesting device using ferromagnetic materials," Applied Physics Letters, vol. 91, no. 9, p. 093508, 2007), but is also well-suited for use in multi-modal energy harvesting, such as thermal and photovoltaic scavenging. Furthermore, the MTG operates in significantly lower thermal gradients and over a wider range of temperatures than current state of the art TEG devices.

The MTG device operation is based on thermally-induced demagnetization of a soft magnetic material with a Curie temperature between that of the heat source and of the cold sink, resulting in mechanical oscillations between heating and cooling states of the ferromagnetic material. When in contact with the hot side the temperature of the soft magnetic material increases until the attraction to the hard magnetic material is overcome by mechanical spring forces. This causes the system to switch states, allowing the soft magnetic material to shed the heat into the cold side, dropping its temperature and re-activating the magnetic attraction. This combination of processes results in mechanical oscillations between heating and cooling states. In the case of generating electrical power, any of the familiar electromechanical transduction mechanisms can then be used to scavenge usable electrical energy from an existing thermal gradient while simultaneously transporting thermal energy form the heat source to the cold sink.

Embodiments of the present disclosure operate on the principle of thermally induced switching between open and closed states of a ferromagnetic switch to generate mechanical oscillations. When the system is cool, the soft ferromagnet will be in the closed position, i.e. in thermal contact with the hot side hard magnet. As the heat from the source conducts into the ferromagnetic material, it will approach its Curie temperature and lose its magnetization. As such, it is understood that the material changes from a ferromagnetic to a paramagnetic state upon transition from temperature below Curie to above Curie. With the opposing magnetic force weakened, the spring returns the ferromagnet and membrane to the cold side of the device, drawing the working fluid into the device. The working fluid will remove the thermal energy from both the hot side and soft magnet on the cold side. Upon sufficient heat transfer into the working fluid, the soft magnet will re-magnetize. This will activate the magnetic force between the hard and soft magnets, returning the magnet to its hot side position and driving out the fluid. Fluid flow direction is determined by passive valves at the inlet and outlet points.

Indeed, any magnetic transition that results in a change in the vector nature of the magnetic moment of the soft magnetic material can be employed, including either the magnitude or direction of the magnetic moment. Non-limiting examples of these transitions include exchange bias coupled materials (as used with magnetic storage media) comprising a ferromagnetic and an antiferromagnetic layer, spin reorientation via antiferromagnetic coupling, ferromagnetic-paramagnetic transition, antiferromagnetic-to-paramagnetic Neel transition, and ferrimagnetic transition across magnetic compensation point.

In an exemplary embodiment, the device of the present disclosure comprises an oscillating ferromagnet, a fixed hot-side permanent magnet, a spring assembly, a membrane, an inlet and outlet valve, and a conduit system. In an exemplary embodiment, the device of the present disclosure serves as a compressor, providing passive, sub-ambient cooling capability.

In an exemplary embodiment, a ferromagnet oscillates between a heat source with a hard magnet, and a heat sink, the gradient between which contains the Curie temperature of the ferromagnetic material. In another exemplary embodiment, a membrane attached between the heat sink and the ferromagnet acts both to provide a restoring force to the heat sink, as well as to drive a fluid into and out of a chamber featuring one-way flow valves. In another exemplary embodiment, a cylinder/piston arrangement is utilized in conjunction with dual one-way valves to generate pumping action. The oscillation of the system requires a thermal gradient, but it otherwise completely passive in nature.

In an exemplary embodiment, the present disclosure provides a magnetothermal pump device comprising a heat source, a heat sink, a first magnetic material with a remanant magnetization, a second magnetic material, a means for providing a restorative force, a conduit, means for controlling directional flow, and a fluid, wherein the first magnetic material is positioned proximal to the heat source, the heat source and heat sink provide a thermal gradient comprising a hot side and a cold side, wherein the second magnetic material has a thermally induced magnetic transition point within or near temperatures included in the thermal gradient, is positioned between the heat source and the heat sink, is in communication with the means for providing a restorative force, and oscillates between a closed position and an open position by binding to the first magnetic material at temperatures below its magnetic transition point through an attractive magnetic force to achieve a closed position and unbinding to the first magnetic material at temperatures above its magnetic transition point through a restorative force provided by the means for providing a restorative force to achieve an open position, wherein the oscillation provides the mechanical energy for driving movement of the fluid through the conduit and the means for controlling directional flow in one direction.

In an exemplary embodiment, the present disclosure provides a magnetothermal pump comprising a first magnetic material capable of being disposed proximal to a heat source, a heat sink, a means for providing a restorative force, a second magnetic material disposed between the heat source and the heat sink and in operable communication with the means for providing a restorative force, optionally a conduit, optionally means for controlling directional flow, wherein the heat source and the heat sink together provide a thermal gradient comprising respectively a hot side and a cold side, wherein during operation the second magnetic material has a thermally induced magnetic transition point within or near temperatures included in the thermal gradient and oscillates between a closed position and an open position.

In an exemplary embodiment, during operation the second magnetic material is capable of binding to the first magnetic material at temperatures below its magnetic transition point through an attractive magnetic force to achieve a closed position; and capable of unbinding to the first magnetic material at temperatures above its magnetic transition point through a restorative force provided by the means for providing a restorative force to achieve an open position; and the oscillation provides the mechanical energy for driving movement of the fluid through the conduit and the means for controlling directional flow in one direction.

In an exemplary embodiment, movement of the fluid through the conduit occurs by providing for a fluid inlet on the hot side of the thermal gradient wherein the fluid is capable of entering a space between the hot side and the second magnetic material when the second magnetic material is in the closed position, is capable of being further drawn into an additional void between the hot side and the second magnetic material that results when the second magnetic material shifts to the open position, and is capable of being expelled from the space through a fluid outlet when the second magnetic material shifts back to the closed position, wherein the fluid inlet and fluid outlet are in communication with the conduit.

In an exemplary embodiment, movement of the fluid through the conduit occurs by providing for a fluid inlet on the cold side of the thermal gradient wherein the fluid is capable of entering a space between the cold side and the second magnetic material when the second magnetic material is in the open position, is capable of being further drawn into an additional void between the second magnetic material and the cold side that results when the second magnetic material shifts to the closed position, and is capable of being expelled from the space through a fluid outlet when the second magnetic material shifts to the open position, wherein the fluid inlet and fluid outlet are in communication with the conduit.

In an exemplary embodiment, movement of the fluid through the conduit occurs by providing for a fluid inlet on both the hot side and the cold side of the thermal gradient wherein the fluid is capable of entering a space between the cold side and the second magnetic material when the second magnetic material is in the open position, being further drawn into an additional void between the second magnetic material and the cold side that results when the second magnetic material shifts to the closed position, being expelled from the space through a fluid outlet when the second magnetic material shifts to the open position, wherein the fluid inlet and fluid outlet are in communication with the conduit, and being expelled from the space through a fluid outlet when the second magnetic material shifts back to the closed position, wherein the fluid inlet and fluid outlet are in communication with the conduit.

In another exemplary embodiment, the present disclosure provides a method of operating a pump, comprising providing a thermal gradient comprising a hot side and a cold side, providing a first magnetic material on the hot side of the thermal gradient, and suspending a second magnetic material within the gradient through a means for providing a restorative force, wherein the second magnetic material has a thermally-induced magnetic transition point and oscillates between a closed position and an open position within the thermal gradient by binding to the first magnetic material at temperatures below its magnetic transition point through an attractive magnetic force to achieve a closed position and unbinding to the first magnetic material at temperatures above its magnetic transition point through a restorative force provided by the means for providing a restorative force to achieve an open position, wherein the oscillation thereby provides mechanical energy which moves a fluid or a gas through a conduit.

In an exemplary embodiment, movement of the fluid through the conduit occurs by providing for a fluid inlet on the hot side of the thermal gradient wherein the fluid enters a space between the hot side and the second magnetic material when the second magnetic material is in the closed position, is further drawn into an additional void between the hot side and the second magnetic material that results when the second magnetic material shifts to the open position, and is expelled from the space through a fluid outlet when the second magnetic material shifts back to the closed position, wherein the fluid inlet and the fluid outlet are in communication with the conduit.

In an exemplary embodiment, movement of the fluid through the conduit occurs by providing for a fluid inlet on the cold side of the thermal gradient wherein the fluid enters a space between the cold side and the second magnetic material when the second magnetic material is in the open position, is further drawn into an additional void between the second magnetic material and the cold side that results when the second magnetic material shifts to the closed position, and is expelled from the space through a fluid outlet when the second magnetic material shifts back to the open position, wherein the fluid inlet and the fluid outlet are in communication with the conduit.

Alternatively, or in addition, the fluid can be circulated through both the hot side and the cold side of the device simultaneously by providing a device operably configured for fluid to enter a fluid inlet on the hot side of the device and enter a fluid inlet on the cold side of the device simultaneously.

In an exemplary embodiment, the present disclosure provides a method of operating a magnetothermal pump, comprising providing a thermal gradient comprising a hot side and a cold side, providing a first magnetic material disposed in operable communication with the hot side of the thermal gradient, suspending a second magnetic material within the gradient on a means for providing a restorative force, wherein the second magnetic material has a thermally-induced magnetic transition point, and oscillating the second magnetic material between a closed position and an open position within the thermal gradient.

In an exemplary embodiment, the oscillating comprises attracting the second magnetic material toward the first magnetic material at temperatures below a magnetic transition point of the second magnetic material by using an attractive magnetic force to achieve a closed position and wherein the oscillating comprises lessening attraction of the second magnetic material to the first magnetic material at temperatures above the magnetic transition point by using a restorative force provided by the means for providing a restorative force to achieve an open position.

In an exemplary embodiment, the oscillating provides mechanical energy which moves a fluid or a gas through a conduit.

In an exemplary embodiment, movement of the fluid or the gas through the conduit occurs by providing for a fluid inlet on the hot side of the thermal gradient wherein the fluid or gas enters a space between the hot side and the second magnetic material when the second magnetic material is in the closed position, is further drawn into an additional void between the hot side and the second magnetic material that results when the second magnetic material shifts to the open position, and is expelled from the space through a fluid outlet when the second magnetic material shifts back to the closed position, wherein the fluid inlet and the fluid outlet are in communication with the conduit.

In an exemplary embodiment, movement of the fluid or the gas into the hot side and the cold side is capable of occurring simultaneously.

In an exemplary embodiment, movement of the fluid or gas through the conduit occurs by providing for a fluid inlet on cold side of the thermal gradient wherein the fluid enters a space between the cold side and the second magnetic material when the second magnetic material is in the open position, is further drawn into an additional void between the second magnetic material and the cold side that results when the second magnetic material shifts to the closed position, and is expelled from the space through a fluid outlet when the second magnetic material shifts to the open position, wherein the fluid inlet and the fluid outlet are in communication with the conduit.

In an exemplary embodiment, the conduit comprises a means for controlling directional flow.

In an exemplary embodiment, controlling directional flow comprises any of or any combination of one-way mechanical valves, non-moving fluid diodes, or a system that provides asymmetric fluid pressure to inlets and outlets In an exemplary embodiment, the thermal gradient is provided by a heat source and a heat sink.

In embodiments, the pump can be operably configured such that movement of the fluid through the conduit occurs by providing for a fluid inlet on both the hot side and the cold side of the thermal gradient wherein the fluid is capable of entering a space between the cold side and the second magnetic material when the second magnetic material is in the open position, being further drawn into an additional void between the second magnetic material and the cold side that results when the second magnetic material shifts to the closed position, and being expelled from the space through a fluid outlet when the second magnetic material shifts to the open position, wherein the fluid inlet and fluid outlet are in communication with the conduit, and being expelled from the space through a fluid outlet when the second magnetic material shifts back to the closed position, wherein the fluid inlet and fluid outlet are in communication with the conduit.

In an exemplary embodiment, the second magnetic material of the present disclosure is configured as a piston attached to a spring which serves as the means for providing a restorative force.

In an exemplary embodiment, the piston and spring of the present disclosure are configured inside a cylinder.

In an exemplary embodiment, the device of the present disclosure further comprises at least one reservoir for holding said fluid.

In an exemplary embodiment, the heat source of the present disclosure is a waste thermal energy source.

In an exemplary embodiment, the first magnetic material of the present disclosure comprises a hard magnet.

In an exemplary embodiment, the hard magnet of the present disclosure comprises NdFeCo, NdFeB, AlNiCo or SmCo. A hard magnet in the context of this specification is a magnet comprising a material that is difficult to de-magnetize, or has a high coercivity.

Coercivity in the context of this specification is understood to mean the intensity of the magnetic field needed to reduce the magnetization of a ferromagnetic material to zero after it has reached saturation. More particularly, whether a magnet is classified as a soft or hard magnet, this concerns the ability of the material to retain a magnetic moment once removed from a field. It is a material with an elevated magnetic remanence. In layman's terms, it represents whether the material will remain magnetized once removed from the field (e.g. refrigerator magnets, speaker magnets, etc.) or whether it will return to a random, unmagnetized state (e.g., a paper clip, nickel-based coins, etc.). In this context, there is no magnetic 'memory' of the soft magnetic material. Once it is removed from close proximity to the 'hard' magnet, it will assume a random, non-magnetized state.

In an exemplary embodiment, the second magnetic material of the present disclosure comprises a ferromagnetic material.

In an exemplary embodiment, the ferromagnetic material of the present disclosure comprises a soft magnet. A soft magnet in the context of this specification is a magnet comprising a material that is easy to de-magnetize, or has a low coercivity.

In an exemplary embodiment, the ferromagnetic material of the present disclosure comprises gadolinium, thin-film La1-xSrxMnO3 (LSMO) ceramics, or powdered cobalt-rich metallic glasses.

In an exemplary embodiment, the ferromagnetic material of the present disclosure is synthesized through thin-film deposition.

In an exemplary embodiment, the means for providing a restorative force of the present disclosure is linear.

In an exemplary embodiment, the means for providing a restorative force of the present disclosure is non-linear.

In an exemplary embodiment, the linear means for providing a restorative force of the present disclosure comprises a membrane or a metallic spring or their combination.

In an exemplary embodiment, the non-linear means for providing a restorative force of the present disclosure comprises any of or any combination of composite laminates, backside (or cold side return) magnets, non-linear springs, or counter-acting magnetic circuits.

In an exemplary embodiment, the non-linear means for providing a restorative force of the present disclosure comprises a shape memory metal alloy or a shape memory polymer, or their combination.

In an exemplary embodiment, the means for controlling directional flow of the present disclosure comprises any of or any combination of one-way mechanical valves, non-moving fluid diodes, or a system that provides asymmetric fluid pressure to inlets and outlets.

In an exemplary embodiment, the fluid of the present disclosure comprises any of or any combination of water, an alcohol, a poly-alkyl glycol, an aromatic, an aliphatic, a silicone, a fluorocarbon, a calcium chloride solution, a potassium formate or acetate solution, a liquid metal, or a nanofluid.

In an exemplary embodiment, the fluid of the present disclosure comprises a liquid gas.

In an exemplary embodiment, the liquid gas of the present disclosure comprises any of or any combination of liquid carbon dioxide, liquid air, liquid helium, liquid hydrogen, or liquid neon.

In an exemplary embodiment, the present disclosure comprises a gas instead of a liquid.

In an exemplary embodiment, the gas of the present disclosure comprises any of or any combination of air, carbon dioxide, hydrogen, helium, or sulfur hexafluoride.

These and other exemplary embodiments of the disclosure will become apparent in the foregoing detailed description.

BRIEF DESCRIPTION OF THE DRAWINGS

FIG. 12A is a schematic diagram, FIG. 12B is a graph, and FIG. 12C is a plot that show calorimetric characterization of a fabricated prototype.

FIGS. 13A and 13B are images showing finite element analysis (FEA) of the magnetic field in close proximity to a magnetic circuit (left) and a through-thickness orientation (right) of similar geometries showing a dramatic concentration of magnetic energy within the circuit.

DETAILED DESCRIPTION OF VARIOUS EMBODIMENTS OF THE INVENTION

Reference will now be made to various exemplary embodiments of the invention. However, the embodiments described in the description and shown in the figures are illustrative only and are not intended to limit the scope of the invention, and changes may be made in the specific embodiments described in this specification and accompanying drawings that a person of ordinary skill in the art will recognize are within the scope and spirit of the invention.

Not wishing to be bound by theory, embodiments of the magnetothermal pump device according to this disclosure operate on the principle of thermally induced switching between open and closed states of a ferromagnetic switch to generate mechanical oscillations. In a more basic operational mode, the device can draw fluid into either the hot side cavity, or the cold side cavity, or both.

Figure 1:
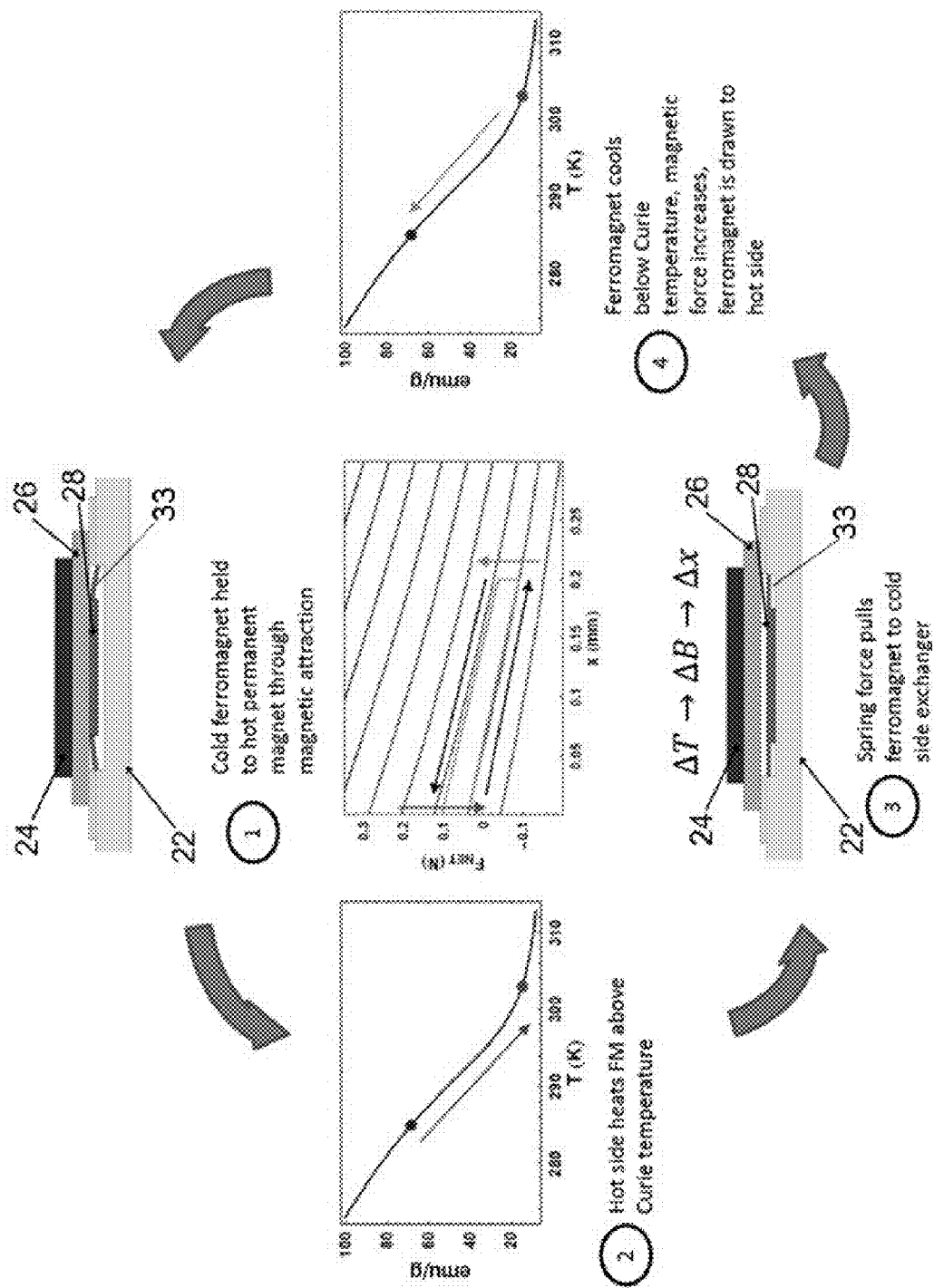
FIG. 1 is a schematic diagram showing operation of an embodiment of a magnetothermal pump device according to this disclosure.

FIG. 1 shows embodiments of steps in the operation of a magnetothermal pump device wherein the second magnetic material is a ferromagnet 28 and the first magnetic material is a hard magnet 26, along with a heat sink 22, heat source 24, and spring 33. Step 1: Ferromagnet 28 in contact with hot hard magnet 26 begins heating. Step 2: As the ferromagnet 28 approaches the Curie temperature, the attractive magnetic force decreases. Step 3: Once the spring force exceeds the magnetic force, the ferromagnet 28 switches states to begin the cooling cycle. Step 4: As excess heat is shed into the cold side exchanger, the magnetic force gradually increases. Once the magnetic force exceeds the spring force, the ferromagnet 28 is attracted to the hot side 24 again and the cycle repeats. Curie temperatures of the ferromagnet 28 will vary depending on the material used and can be selected in a manner to provide for the needs of a particular application. For example, the Curie temperature can range from 50-1500 K, such as from 60-1200 K, or from 80-1000 K, or from 100-800 K, such as from 150-600 K, or from 200-500 K, such as from 300-400 K and so on.

The following provides further description of embodiments of steps in the operation of magnetothermal pump devices as shown in FIG. 1. For example, embodiments of the pump device of the present disclosure may include a configuration wherein fluid intake occurs on the hot side 24 of the magnetothermal pump device. In this case, hot side fluid intake may occur wherein a cooling fluid enters the space between the hot side 24 and the ferromagnet 28 after sufficient energy has flowed into the ferromagnet 28, raising its average temperature such that the soft-to-hard magnetic force is less than the cold-side restoring force. This occurs at step 1 in FIG. 1, which shows the ferromagnet 28 in the closed position. As the restoring force pulls the ferromagnet 28 from the closed position, the fluid is drawn into the resulting void, as shown in step 3 in FIG. 1. For cooling operation, the incoming fluid will draw thermal energy from both the hot side magnet 26 and the ferromagnet 28, acting as a heat sink for both. Under a strictly pumping operation, the ferromagnet 28 will contact an alternative heat sink (cold side) 22. Once sufficient thermal energy has been drawn from the ferromagnet 28, the increasing hard-to-soft magnetic attraction will once again draw the device into the closed position (step 1 in FIG. 1). The movement of the ferromagnet 28 and means for providing a restorative force (e.g. spring 33) will force the working fluid in the direction determine by mechanical or pressurized flow channel controls.

Other embodiments of the magnetothermal pump device of the present disclosure may include a configuration wherein fluid intake occurs on the cold-side of the device. For example, for cold-side intake, a working fluid will be drawn into the space between the ferromagnet 28 and the cold-side heat sink 22 as the device is drawn to the closed position (step 1 in FIG. 1). Thermal energy will transfer to the ferromagnet 28 and the working fluid through conduction, and subsequently be passed through to the backside heat sink 22. Once adequate heat has been stored within the ferromagnetic material, the restoring forces draw the device into the open position (step 3 in FIG. 1), expelling fluid from the cavity.

Figure 15:
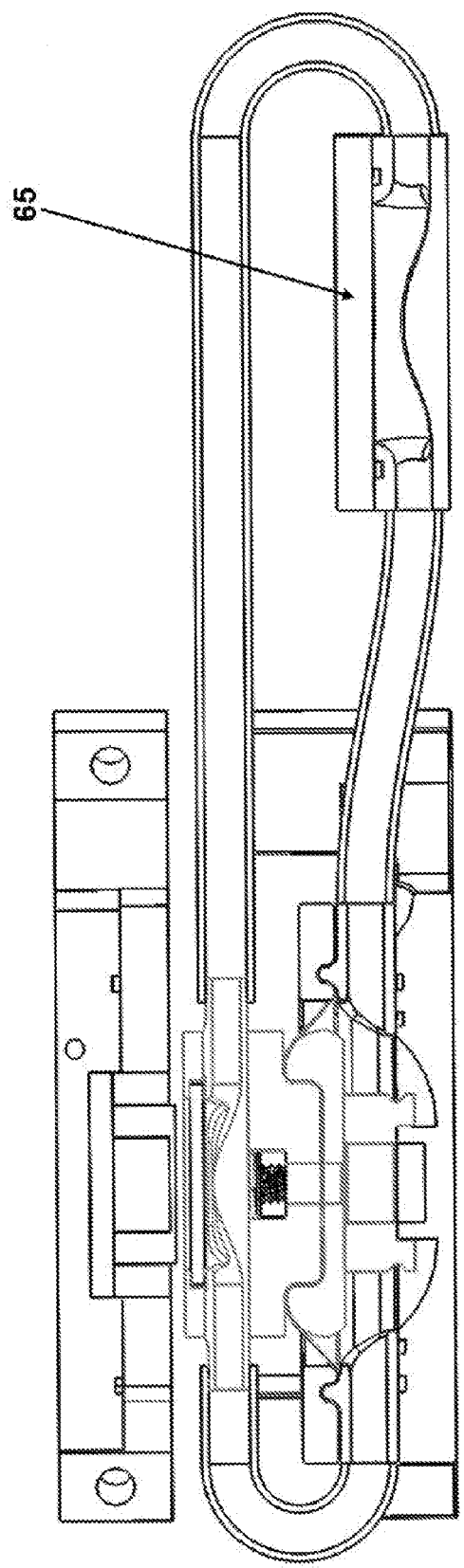
FIG. 15 is a schematic diagram showing an embodiment of a magnetothermal pump device connected to a fluid reservoir according to this disclosure.

Further exemplary embodiments of the magnetothermal pump device of the present disclosure and its configurations will be now described. In a preferred embodiment, shown in FIG. 2A, the pump device of the present disclosure comprises one or more of a first magnetic material which is preferably a hard magnet 26 positioned at the hot side of the device, a second magnetic material which is preferably a ferromagnetic material such as a soft magnet 28 suspended within a thermal gradient by way of a means for providing a restorative force which may be an impermeable membrane 32. Transitions in the balance between the magnetic force attracting the ferromagnetic material 28 to the hard magnet 26 versus the restorative force of the membrane 32 cause thermally-induced oscillations of the membrane 32 between the hot and cold side of the device, causing it to induce a net, unidirectional flow of fluid 30 perpendicular to the thermal gradient. The device further comprises a hot side heat source 35, cold side heat sink 37, a fluid transport conduit 38, means for controlling directional flow which in some embodiments may be achieved through one-way valves 34, a fluid 30, and optionally at least one fluid reservoir. Arrows show the direction of flow provided by the one-way valves 34. An embodiment of a device with a fluid reservoir 65 is shown in FIG. 15.

Figure 2A:
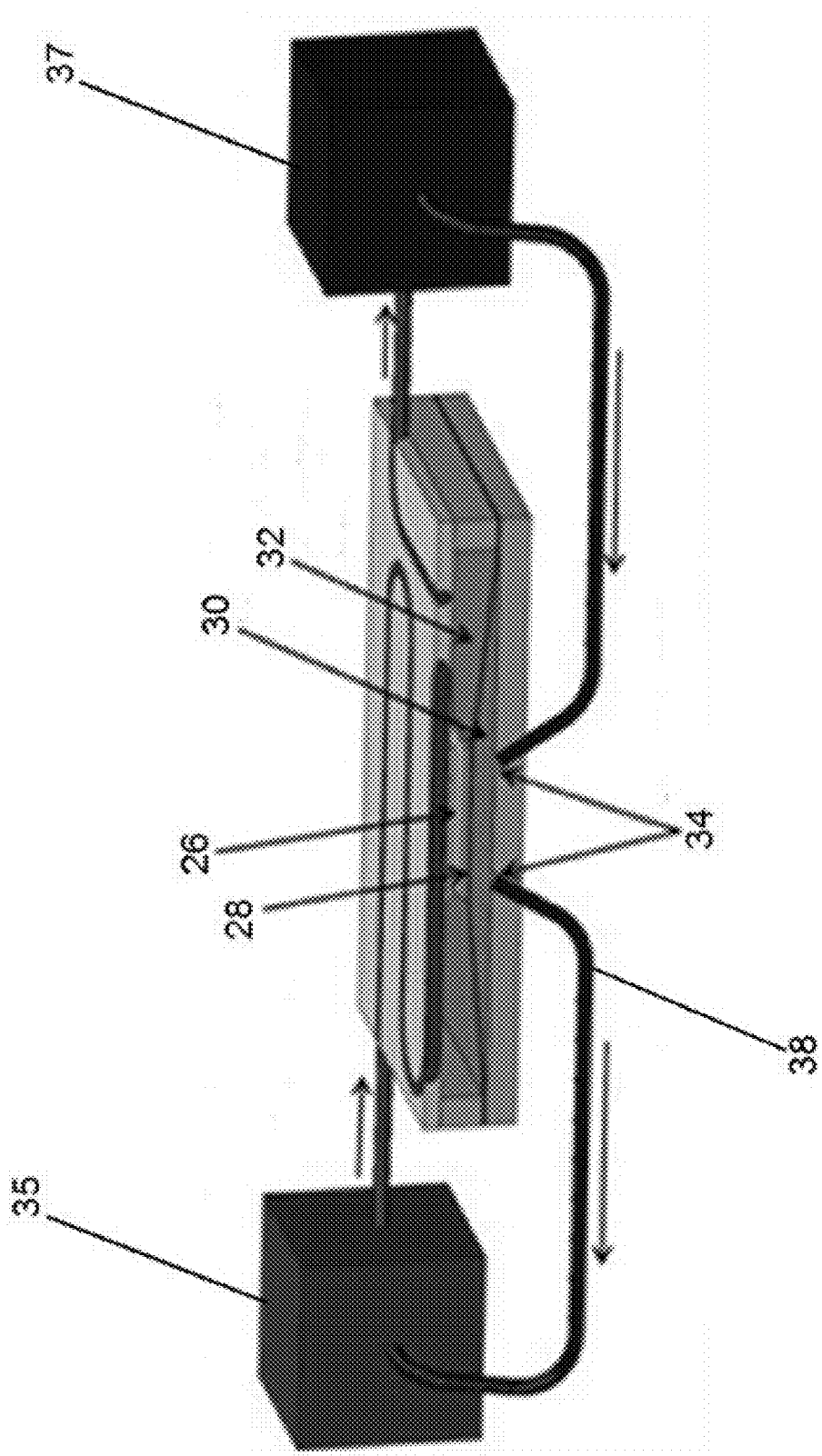
FIGS. 2A and 2B are schematic diagrams showing embodiments of a magnetothermal pump device according to this disclosure.
Figure 2B:
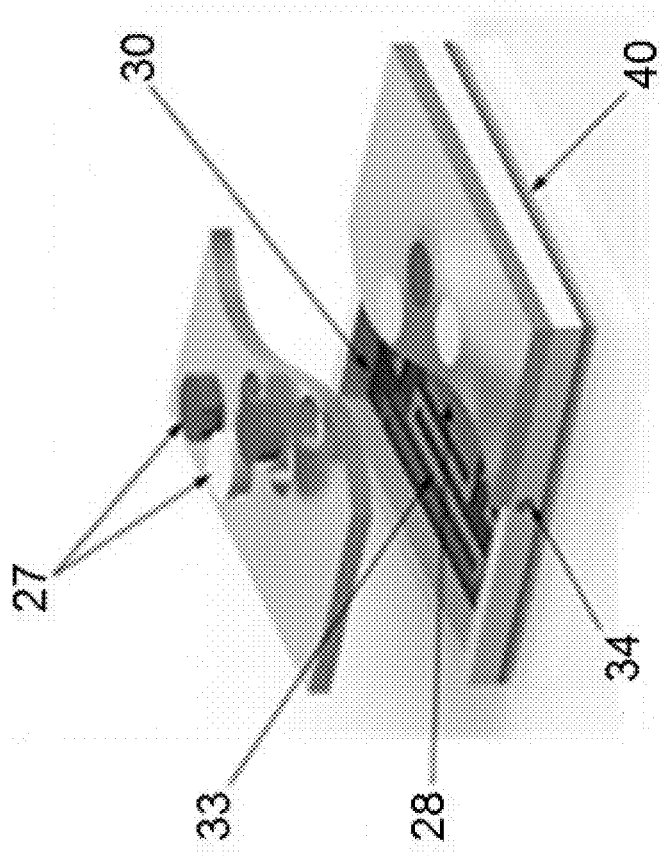

FIG. 2B shows a schematic representation of an exemplary embodiment wherein the magnetothermal pump device comprises a series of hard magnets 27 operating as a magnetic circuit to overcome shape demagnetization of thin form factor magnets. This embodiment comprises a high-energy, non-linear restoring spring 33 in place of a membrane as the means for providing a restorative force, as well as a tunable switching temperature ferromagnet 28. Further, this embodiment comprises a low profile active area 40.

Figure 3A:
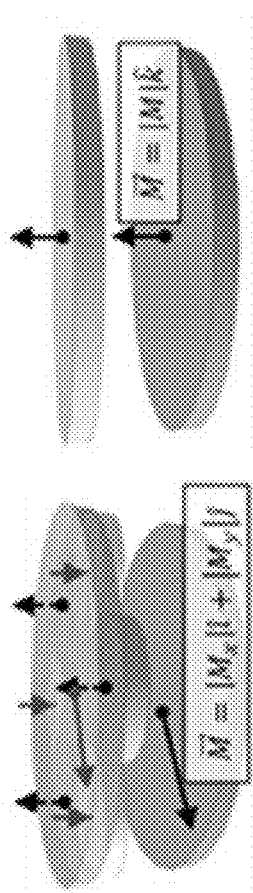
FIG. 3A is a schematic diagram showing the magnetic forces of a magnetic circuit (left) or a single magnet (right).

As FIGS. 2A and 2B show, exemplary embodiments of the temperature-dependent magnetic couple of the device may be achieved using either a single magnet or a magnetic circuit consisting of components on the device hot side. FIG. 3A shows both of these embodiments in further detail including the principle of their operation. Magnetic circuits may be particularly useful in overcoming device limitations incurred due to temporary or permanent thermal demagnetization of hot side magnets while overcoming shape demagnetization induced due to thin component form factors of both hot side magnets and ferromagnets.

In exemplary embodiments, the ferromagnet layer of the magnetothermal pump device may be synthesized through thin-film deposition techniques, which may comprise any magnetic material or combination of magnetic materials with both sufficient magnetization and a Curie temperature that lies within an appropriate operating range for the particular range of fluid temperatures which may be expected during operation of the device. Exemplary temperatures for the fluid (e.g., liquid, gas, plasma, or combinations) during operation may range for example from between 0-450° C., such as from 10-400° C., or from 20-300° C., or from 50-250° C., such as from 80-225° C., or from 100-200° C., or from 110-175° C., and so on. Non-limiting examples of magnetic materials that may be used in the ferromagnet layer include Gadolinium, thin-film $La1-xSrxMnO_3$ (LSMO) ceramics, and powdered cobalt-rich metallic glasses.

In exemplary embodiments, the hot side hard magnet may comprise any material or combination of materials with both sufficient magnetization and resistance to demagnetization at the operating temperatures of the device. Non-limiting examples of materials that may be used in construction of the hot side magnet include neodymium-based magnets such as NdFeCo and NdFeB, as well as other commercially available magnets such as AlNiCo and SmCo.

Included in embodiments is a device for transduction of thermal energy into mechanical energy comprising a material disposed within a thermal gradient, where transduction from thermal to mechanical energy is achieved through thermally-induced changes in magnetic properties of the material. Such devices can be operably configured such that the mechanical energy is capable of being harnessed in a manner to move a working fluid.

Additionally or alternatively, such devices can be operably configured such that the thermal energy is capable of being transported in whole or part. Likewise, such devices can be operably configured such that the thermal energy is capable of being transported across the thermal gradient to a cold side or hot side of the device.

In embodiments, the devices can be operably configured such that the mechanical energy is capable of being harnessed in a manner to provide pressurization of a gas for a compressor, or actuation of pneumatic or hydraulic systems.

Any device according to embodiments of the invention can comprise a permanent magnet or magnetic circuit disposed in operable communication with a hot side of the thermal gradient. Devices of the invention can comprise a soft magnetic material exhibiting a thermally-induced magnetic transition point, which is disposed on a flexible membrane. In such devices, the magnetic transition point of the soft magnetic material can lie within or near temperatures contained by the thermal gradient.

Figure 4A:
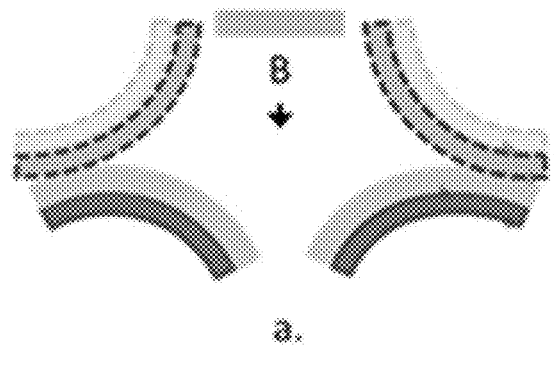
FIGS. 4A-4C are schematic diagrams showing composite laminates, backside magnets, and nonlinear spring embodiments of non-linear means for providing a restorative force according to this disclosure.
Figure 4B:
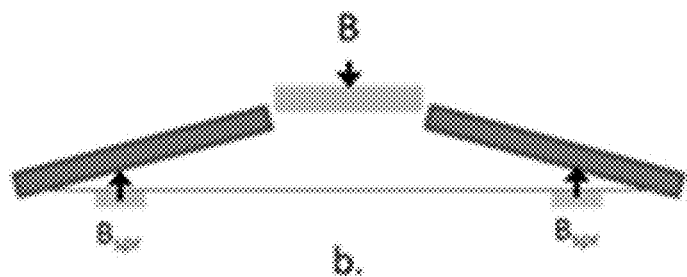
Figure 4C:
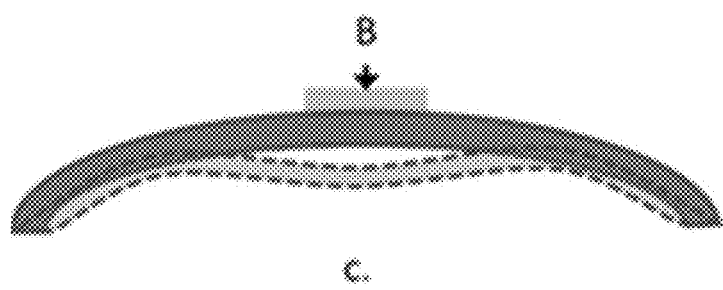

Further, exemplary embodiments of the means for providing a restorative force of the device, which acts in the opposite direction to that of the hard-to-soft magnetic couple force may provide a linear or nonlinear restoring force. Linear means for providing a restorative force may include membranes wherein the spring constants provide a restoring force, or metallic springs. Non-linear means for providing a restorative force may include magnetoelectric laminates such as asymmetric magnetostrictive layers or bimetal laminates or nonlinear springs such as shallow-curved arch springs. Non-limiting examples of the non-linear means for providing a restorative force composition or configuration include traditional shape memory alloy (SMA) materials, shape memory polymers, buckle-through springs, or counteracting magnetic circuits. FIGS. 4A-C shows exemplary embodiments of composite laminates (A), backside (or cold side return) magnets (B), and non-linear springs (C) as examples of non-linear means for providing a restorative force that can be used in embodiments of the device.

In exemplary embodiments of the device, means for controlling directional flow of the device may include mechanical valves, such as one-way mechanical valves, non-moving fluid diodes, or a system that provides asymmetric fluid pressure to inlets and outlets.

Non-limiting examples of fluids that may be used in embodiments of the magnetothermal pump device of the present disclosure include any of or any combination of water, an alcohol such as methanol or ethanol, a poly-alkyl glycol such as ethylene glycol or propylene glycol, an aromatic such as diethyl benzene [DEB], dibenzyl toluene, diaryl alkyl, or partially hydrogenated terphenyl, an aliphatic such as paraffinic and iso-paraffinic type aliphatic hydrocarbons, a silicone such as silicone oils, a fluorocarbon such as perfluorocarbons (i.e., FC-72, FC-77) hydrofluoroethers (HFE) and perfluorocarbon ethers (PFE), a calcium chloride solution, a potassium formate or acetate solution, a liquid metal, or a nanofluid. In another exemplary embodiment, the fluid may be a liquid gas. Non-limiting examples of liquid gases that may be used in the present disclosure include any of or any combination of liquid carbon dioxide, liquid air, liquid helium, liquid hydrogen, or liquid neon. In another exemplary embodiment, a gas may be used in the present disclosure in substitution of the fluid. Non-limiting examples of gases that may be used in the present disclosure include any or any combination of air, carbon dioxide, hydrogen, helium, argon, or sulfur hexafluoride.

The working fluid or gas of the magnetothermal pump device of the present disclosure may serve a variety of applications. In some embodiments, wherein the device of the present disclosure operates as a thermal transport device (either a heater or a cooler), the working fluid serves as an additional thermal sink or source. In other embodiments, under operation as a fluid device alone, the working fluid could be made to operate hydraulic devices, or, in the case of a gaseous working fluid, could be pressurized for mechanical energy storage or actuation.

Figure 5:
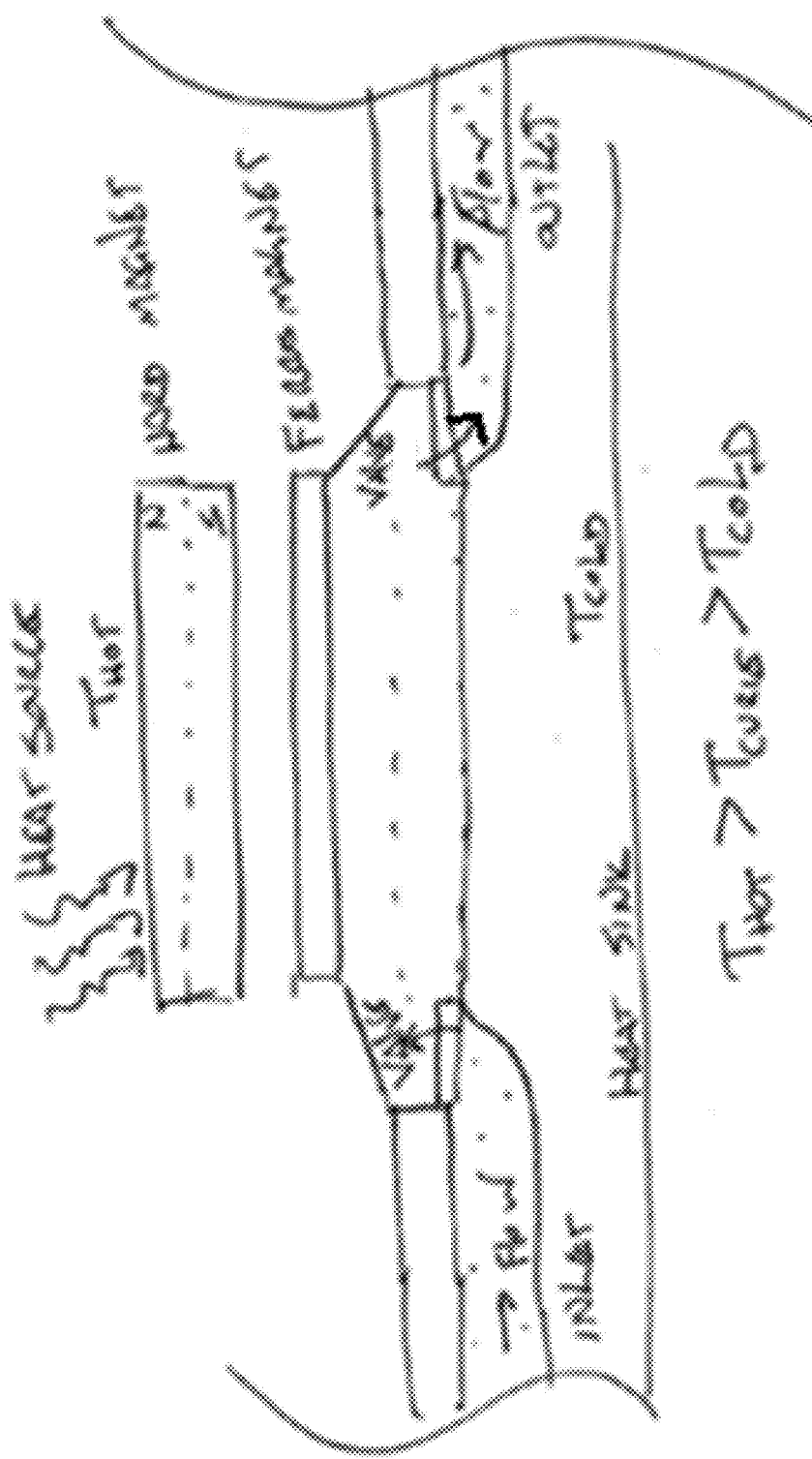
FIG. 5 is a line drawing showing operation of an embodiment of a magnetothermal pump device according to this disclosure.

FIG. 5 shows a line drawing of an exemplary embodiment of an operating magnetothermal pump device according to the disclosure. As shown in FIG. 5, the pump comprises one or more of a heat source, a heat sink, a hard magnet, a ferrous magnet, an inlet, an inlet valve, and outlet, and an outlet valve. It is noted that features of any of the devices and methods illustrated in this specification can be combined or substituted with any one or more feature of another embodiment described herein. Movement of the ferrous magnet in the thermal gradient toward the hard magnet causes a net inflow of water from the inlet into a space between the ferrous magnet and the cold side of the device, while movement of the ferrous magnet away from the hard magnet toward the cold side causes a net outflow of water through the outlet. Arrows show directionality of valves and the flow of liquid through the device according to an embodiment of the disclosure. Other valve configurations and flow patterns are also possible, including the reverse of that illustrated, with such modifications understood to be within the skill in the art. It is further noted that the Curie temperature need not necessarily fall within the gradient of the hot and cold sides of the device.

Figure 6:
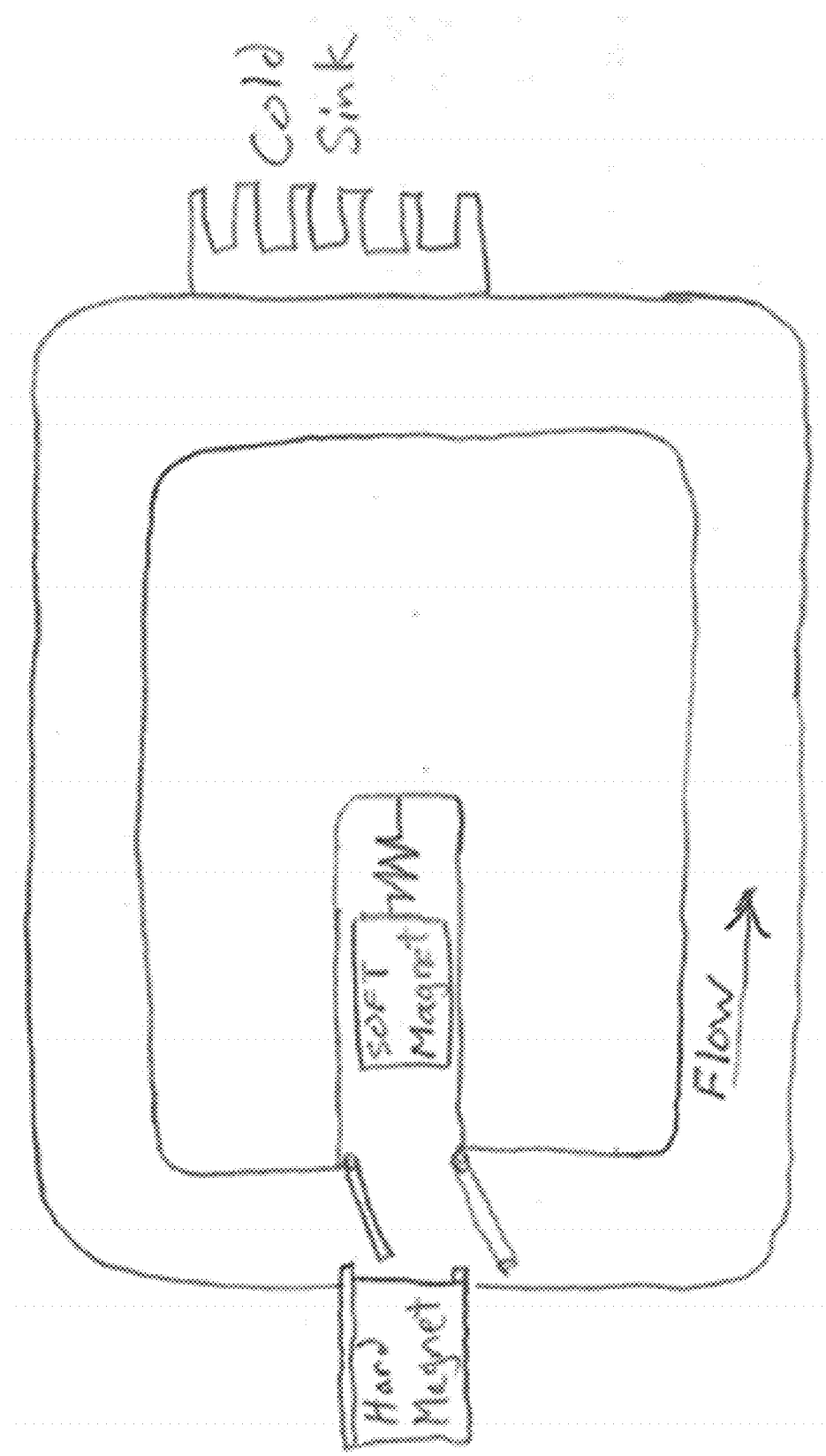
FIG. 6 is a line drawing showing operation of another embodiment of a magnetothermal pump device according to this disclosure.

FIG. 6 shows a line drawing of an exemplary embodiment of a magnetothermal pump device comprising a thermally-induced oscillating piston according to the disclosure wherein the piston is a soft magnet contained in a cylinder and attached to a mechanical spring at one end which provides the restorative force. As the soft magnet approaches the hard magnet, it pushes fluid through a one-way valve, causing net movement of fluid through a circuitous conduit, which lies between a heat source and heat sink. An additional one-way valve prevents back flow through the system.

Figure 7B:
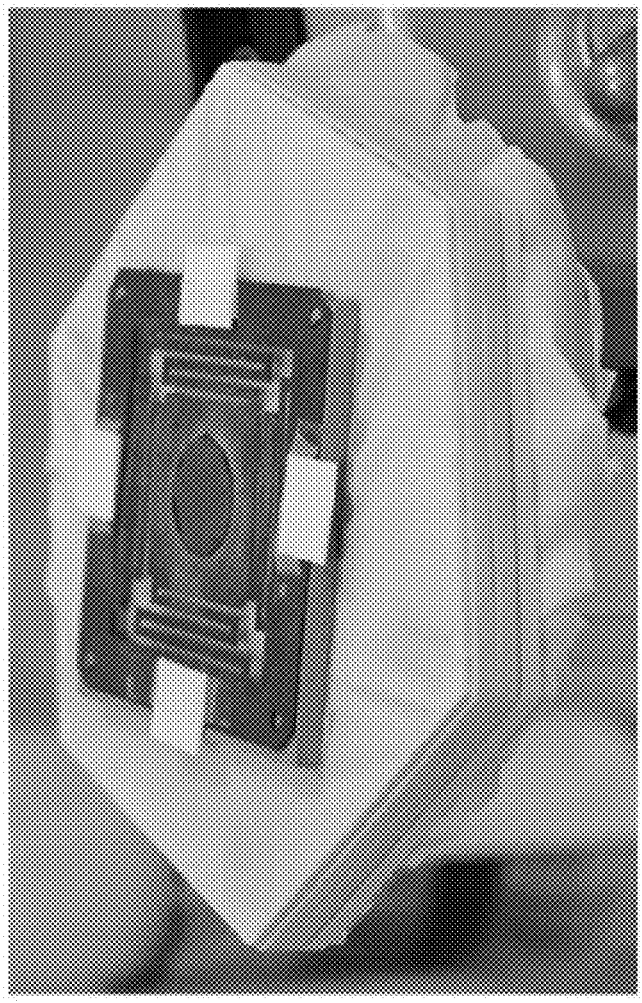
FIGS. 7A, 7B, and 8 are photographs showing prototypes of a magnetothermal pump device according to this disclosure.
Figure 7A:
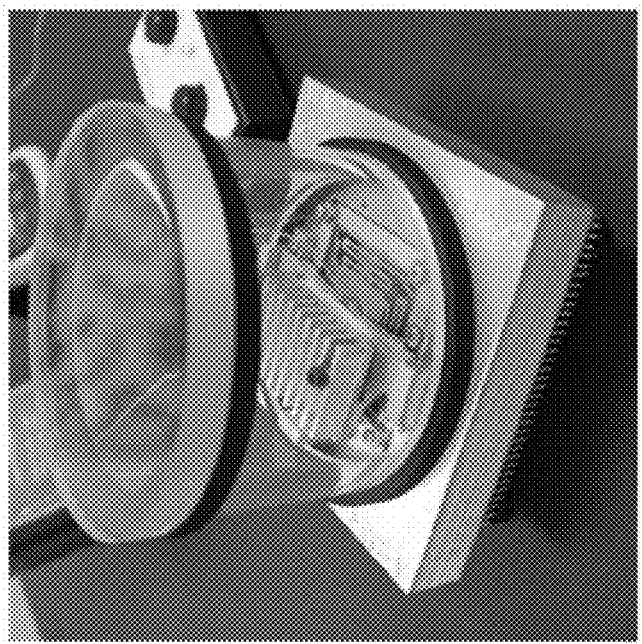
Figure 8:
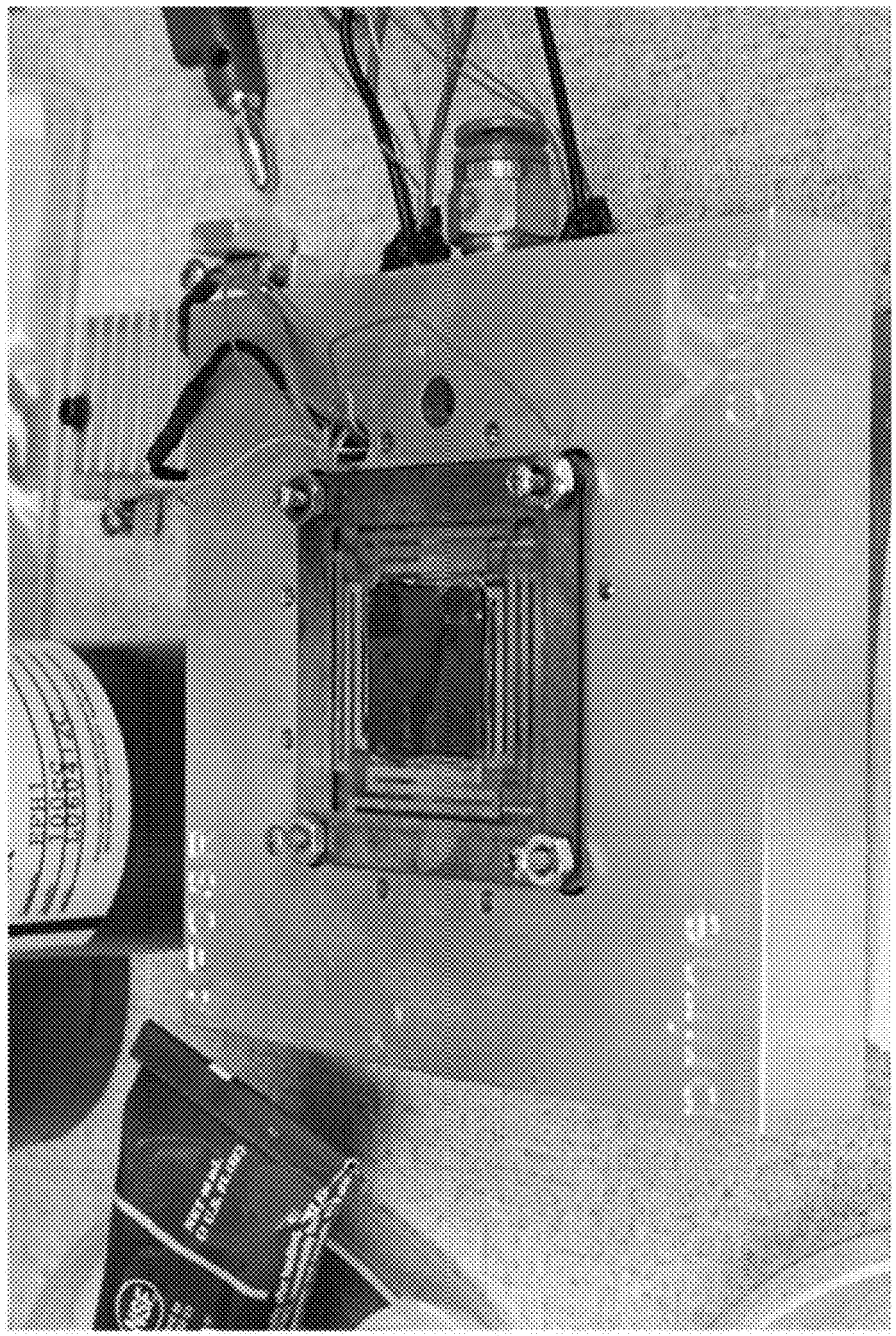

FIGS. 7A and 7B and FIG. 8 are photographs showing exemplary embodiments of prototypes of this disclosure.

Embodiments of the pump device of this disclosure have several characteristics which provide advantages over existing pumps. One of these characteristics is automatic response, wherein the power density of the device is proportional to the thermal gradient, resulting in self-tuning to provide cooling appropriate to any heat load. Further, the device is self-powered as the innovative thermal pump draws all of its power from the thermal source. Waste thermal energy is scavenged and converted into mechanical energy. The mechanical energy may be used to aid in convective cooling, or used to compress a working fluid in a compressor-based heat pump. The resulting system provides continual operation over the course of a mission without taxing limited mission-critical energy reserves. In addition, the versatility of the device provides potential application to all situations where cooling is necessary, either as a stand-alone cooler, or in conjunction with existing cooling systems for added efficiency. The device of this disclosure provides for manipulation of hot-side heat exchangers and fluidic pump assemblies to fit a wide variety of geometries, with either gaseous or liquid working fluids. The magnetic materials at the heart of the system can be tuned to operate over a wide range of temperature gradients and hot- and cold-side temperatures. The pressure driven cooling mechanism does not require buoyancy-based convective transfer, allowing for micro-gravity operation. Still further, the pump device of this disclosure provides for quiet operation. As it circulates a liquid working fluid to provide optimal cooling, it provides an inherent reduction in noise versus typical air cooling. Further noise reduction can be achieved through minimization of internal thermal resistance through the use of compliant, thermally conductive pads that dampen the minimal noise present and enhance heat transfer. The operational frequency of the device can be designed to preclude vibration in restricted frequency regimes as well. Finally, the device provides for scalable operation as the magnetothermal transduction method operates over a wide range of length scales—from MEMs-scale integrated microfluidic channels, to macro-scale hydraulic pressure reservoirs. Additional advantages include low maintenance, no moving parts, and a low profile active area.

Additional characteristics, advantages, and enabling description of exemplary embodiments of the device and method according to this disclosure will be provided in the foregoing Examples.

EXAMPLES

Figure 9:
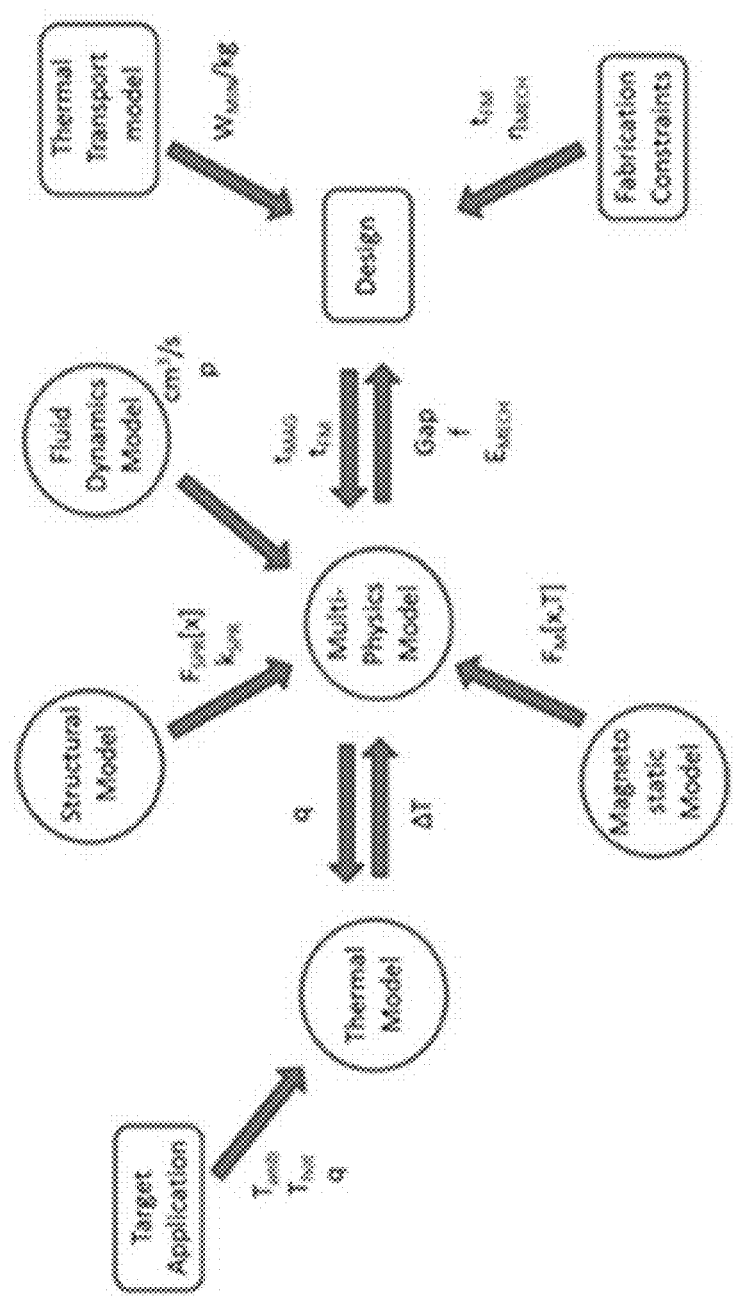
FIG. 9 is a schematic diagram showing individual model components of a magnetothermal pump device according to this disclosure.

Magnetothermal Device Model. A multi-physics model for magnetothermal pump device operation. Magnetothermal oscillation is an inherently complex system to model. Such systems incorporate interdependent relationships between temperature-dependent magnetic properties, closed magnetic circuits, nonlinear spring dynamics, thermodynamics, and fluid flow. Individual model components treating with the constituent physical relationships of the device can be developed using a collection of software tools including custom-written MATLAB and Mathematica finite difference codes, as well as significant contributions from ANSYS Thermal and structural commercial finite element analysis suites (FIG. 9). The complexity of the physics governing the operation of the self-powered pump can be addressed through generation of many standalone components. Such components can model thermal, magnetic, structural, and fluid dynamics aspects of the self-powered pump operation. The individual components can be linked through iterative relationship feed-through, allowing for rapid delineation of parameter interrelations. Initial models with reduced dimensionality can allow for rapid development of governing relationships to describe operation of the device under a wide variety of thermal and dynamic conditions. The individual model components can also be better interfaced, with modification of assumptions and boundary conditions to produce a more unified, multi-physics modeling package.

Figures 10A, 10B:
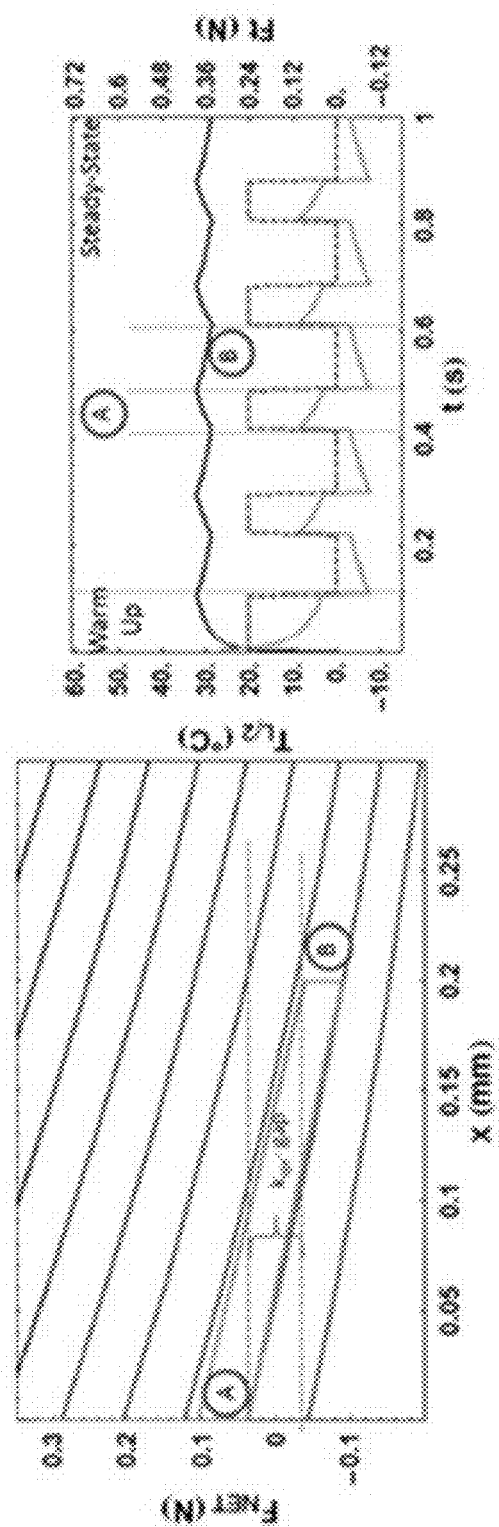
FIGS. 10A and 10B are graphs which show modeling efforts that describe operation of a hybrid magnetothermoelectric harvesting device.

A preliminary model was developed to provide for a better understanding of the physics governing the operation of the magnetothermoelectric generator device (MTG) (see FIGS. 10A and 10B). Modeling efforts that describe the operation of a hybrid magnetothermoelectric harvesting device incorporated a similar strategy to link thermal, mechanical, magnetic, and piezoelectric subcomponents into an iterative multi-physics unit showed excellent agreement with empirical data on a prototype device. The design constraints for an MTG device to be used as a supplemental energy harvester in solar aircraft applications are understandably quite different from those necessary to provide for thermally-driven fluid pumping. Thus, previously developed models may need to be adapted to describe the operation of the pump device. Thermal transport and fluid mechanics are two areas of design that can be addressed.

Figure 11B:
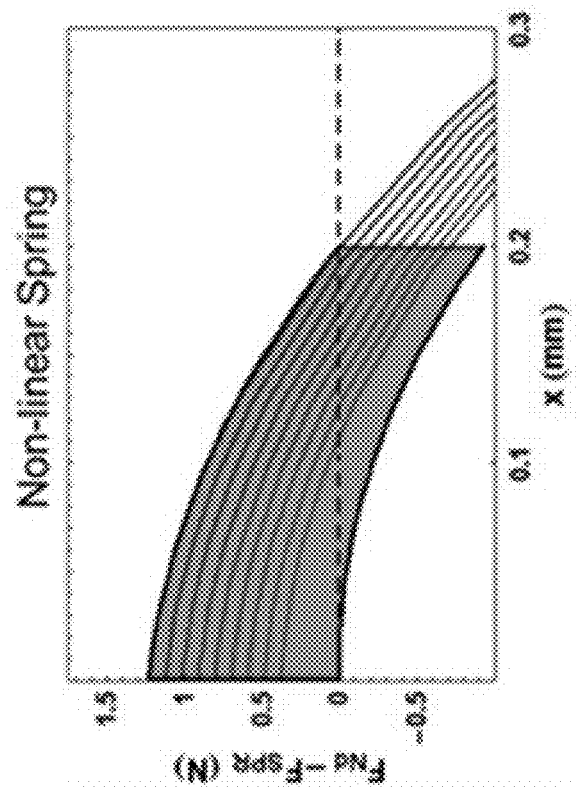
FIGS. 11A and 11B are graphs that plot internal energies of a linear spring and a non-linear spring, showing that the mechanical energy of the magnetothermal oscillator can be increased dramatically through inclusion of a non-linear restoring force.
Figure 11A:
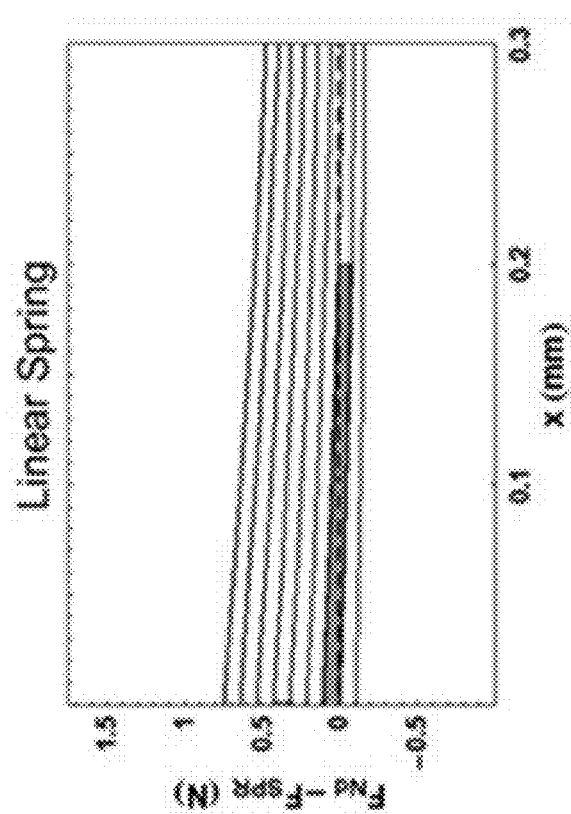

Design of Nonlinear Restoring Force. For a system oscillating between two states, as self-powered pump devices according to embodiments of this disclosure are capable of, the power available for work can be expressed as:

$$P = E_{mech} f$$

where f is the oscillation frequency in Hz, and $E_{mech}$ is the mechanical energy of the system. For the magnetothermal transducer, the mechanical energy of the system depends on the net forces acting on the ferromagnetic material, as well as the spacing between the open and closed states:

$$E_{Mech} = \int_0^{Gap}(F_{Cold} - F_{Hot})dx$$

where $F_{Cold}$ and $F_{Hot}$ are the net force versus distance relationship for the hot and cold ferromagnet critical switching temperatures, and Gap is the spacing between the two states. For simple linear spring dynamics, the hot and cold switching temperatures (and corresponding forces) of the ferromagnet are defined by the spring constant, preload, and gap. Incorporation of a spring with a nonlinear deflection response decouples the critical switching temperatures from the gap spacing of the MTG. Such independence in parameters allow for a wider swing in hot and cold switching temperatures, thereby increasing the mechanical energy of the system (FIGS. 11A and 11B). For identical geometries, the internal energy, shown as the green areas, of the linear restoring force system (left) can be enhanced by nearly an order of magnitude through inclusion of non-linearity (right) with no change in operational frequency. Furthermore, nonlinear spring dynamics decouples switching temperature from gap spacing, significantly opening the design space of the device in terms of thermal gradients and oscillation frequency.

Depending on the shape of the spring deflection response curve, the nonlinearity can also act to increase the force between the ferromagnet and the hot-source and cold-sink. The increased force increases the microscopic contact area, thus increasing the thermal flux across the interface. Such operation will become even more important with the inclusion of noise-eliminating compliant interface layers. Modeling results indicate that incorporation of nonlinear spring dynamics has the potential to increase the mechanical energy and specific power of the system by an order of magnitude.

There are a variety of methods used to incorporate non-linear deflection response (FIGS. 4A-4C)—from nonlinear deflection curves, to asymmetric material properties, to counteracting magnets. While mechanical, shallow-curved arch springs or shape memory alloy (SMA) materials have the potential to provide the required nonlinear characteristics, both come with significant difficulty in implementation. Shallow arch mechanical springs are fairly simple to model, but the structure is extremely sensitive to fabrication processes and material defects—the latter complication is even more pronounced for MEMs-scale devices. Shape memory alloy materials display nonlinear behavior through a thermally induced phase change. Asymmetric magnetostrictive layers require tight control of magnetic bias and dynamic field amplitude.

While the inclusion of non-linear spring characteristics can significantly increase the energy density of the system, independently of magnetic circuit properties, dynamic effects of non-linearities must be examined and explored. Materials requiring a phase transition to provide nonlinearity will be constrained by thermal transport and relaxation mechanisms, incurring an effective low-pass filtering of mechanical response. Since power density is proportional to operational frequency, time-lag responses of such systems may act to offset gains in mechanical energy stored in the system. The temporal response of the nonlinearity can, under certain constraints, be mitigated somewhat by engineering coolant flow to aid in heating or cooling of phase change materials. Among the potential candidates are traditional shape memory alloys, shape memory polymers, buckle-through springs, or inclusion of counteracting magnetic circuits.

Non-linear spring implementations can be evaluated with design constraints and parameter interrelationships developed through the multiphysics model, ANSYS mechanical model, and magnetostatic models. In this manner, the optimal nonlinear spring configuration can be determined to maximize the mechanical energy in the system without incurring a penalty in terms of specific mechanical power, inherent system implementation complexity, or cost. The design constraints coupled with specific operational predictions from simulations can be used to form the basis of prototype fabrication.

Prototype fabrication. The MTG device developed in earlier work can be used as the basis to enable fabrication of a functional prototype magnetothermal oscillator. FIGS. 7A and 7B show such a prototype magnetothermal oscillator, which is capable of being (A) operated over wide temperature swings with various thermal gradient conditions—both under vacuum and in ambient conditions. The electrical generator can be modified to provide for fluid pumping capabilities (B).

Hardware for device embodiments of this disclosure can incorporate working fluid exchange volumes, one-way flow valves, and noise-reducing compliant dampeners (FIG. 2B). Thermal gradients and hot- and cold-side temperatures can be induced through inclusion of thermoelectric generators to allow for evaluation over a wide range of thermal conditions. The magnetic force of the device can be configured to feature a preliminary magnetic circuit design that will allow for concentration of magnetic energy within the device, and help to mitigate shape demagnetization effects incurred for low-aspect ratio magnetic components.

Characterization of Prototype Operation. Test and characterization of the fabricated prototype can be performed across a range of environmental temperatures and geometric parameters. Operational parameters such as hot and cold side temperatures, oscillation frequency, volumetric fluid transport rates, and total power can also be examined (FIGS. 12A-12C). Calorimetric characterization of fabricated prototype will allow for validation of multi-physics models, optimization of design parameters, and verification of subcomponent performance. Quantification of specific thermal cooling capacity will allow for proper scaling of the pump to accommodate thermal loads in the 1 kW range.

The specific cooling capacity of a self-power magnetothermal pump device can be determined, configured, or adjusted to meet specific application needs. In order to quantify the cooling capacity of the device, calorimetric heating of the hot-side of the device in a contact-exchange configuration can be performed. For example, a hot-side thermal load can be applied using commercially available thermoelectric heaters. The power required to maintain a hot-side temperature set point can be evaluated as a function of system parameters or ambient intermediary heat sink temperature, inlet coolant temperature, operational frequency, and device geometry. Such calorimetric studies will not only validate multiphysics models developed, but will serve to independently qualify pump device subcomponents. Furthermore, such operational studies can be used to aid in tuning of device variables to provide optimal performance over a wide range of operational conditions. In order to properly size active areas, heat exchangers, and fluid delivery lines, the specific cooling capacity of the device should be fully understood.

Design of Magnetic Circuit and Selection of Magnetic Materials. As mentioned previously, the power density of the device is proportional to the product of the internal mechanical energy and the operational frequency. Previous efforts on magnetothermoelectric generation demonstrated that the operational frequency of the device is a strong function of the through thickness spacing between the hard and soft magnets. Furthermore, as the thickness of the ferromagnet is decreased, the thermal mass also decreases, increasing thermal cycle frequencies, albeit at the cost of reduced magnetic moment of the ferromagnet. In embodiments, it may therefore be beneficial, in terms of operational frequency, to reduce the thickness of the device, especially the gap between the hard and soft magnet.

Figure 3B:
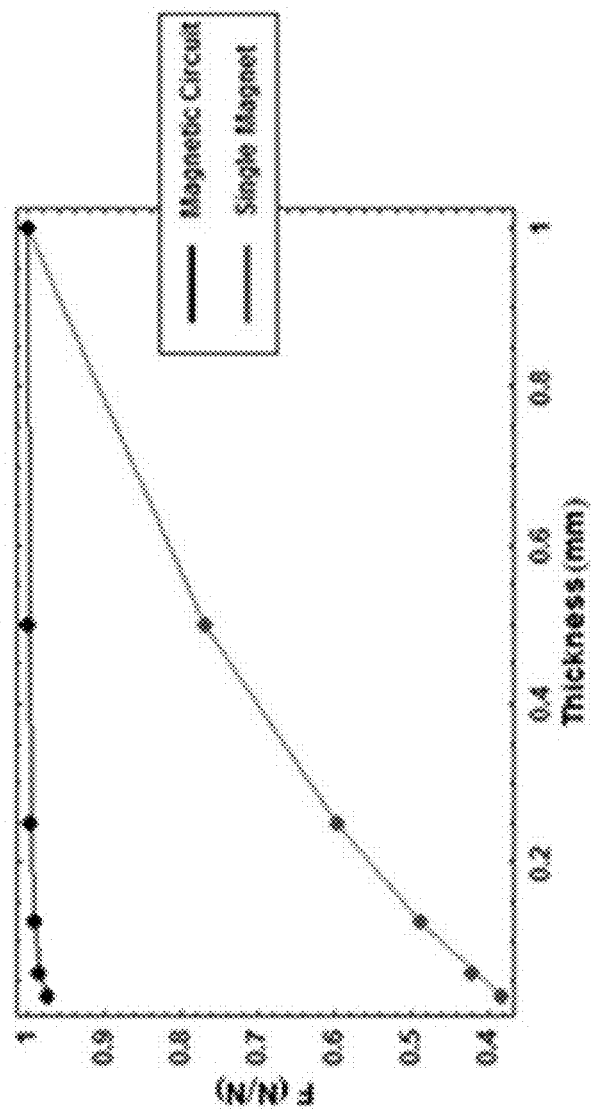
FIG. 3B is a graph plotting force vs. thickness for a magnetic circuit and a single magnet.

One of the drawbacks associated with scaling the device is that the magnetic force between the hard and soft magnets is increasingly diminished with decreasing aspect ratio. For reduced aspect ratio, both the hard and soft magnets will experience shape induced demagnetization—effectively lowering the magnetic moments of the materials. In order to overcome the shape demagnetization associated with the reduced aspect ratio for a through-thickness magnetization, the configuration of the magnetic components in the system can be configured from a through-thickness configuration to an in-plane, quasi-closed magnetic circuit configuration. As shown in FIGS. 3A and 3B, conversion of the magnetization of the ferromagnet from through-thickness to in-plane can result in a dramatic increase in magnetic force per unit mass. Such reconfiguration allows for scaling of the geometry of the ferromagnetic layer to tune and optimize frequency, incorporate thin-film deposition techniques, and to maintain a small thermal inertia in the ferromagnetic material.

Reconfiguration of the magnetic components from a through-thickness to a circuit configuration strengthens the magnetic field through several mechanisms. First, altering the aspect ratio with respect to the direction of magnetic polarization will minimize shape demagnetization effects both in the hard and soft magnets. For example, altering the hard magnet geometry from a disk with a thickness-to-diameter ratio of 0.05 (D=2.5 mm, t=0.125 mm) to an aspect ratio of 0.15 (D=0.83 mm, t=0.125 mm) increases the permeance coefficient of the magnet from 0.1 to 0.34 (FIGS. 3A and 3B). The increased aspect ratio results in a nearly 300% increase in face strength of the magnet.

A similar and more dramatic effect can be obtained in the ferromagnet layer upon conversion to an in-plane magnetization (FIGS. 3A and 3B). Rotating the magnetization of the layer from the through-thickness configuration to an in-plane magnetization increases the permeance coefficient from 0.1 to roughly 17, effectively removing the shape demagnetization field completely. Such a shift in configuration allows for the use of thin-film deposition techniques for synthesis of the ferromagnet layer of the magnetothermal device. Such thin-film deposition techniques might be required to synthesize materials with Curie temperatures that lie within a desirable. Gadolinium has been used as the soft magnetic material in our MTG device due to a convenient transition temperature lying around room temperature, and relatively high magnetization. Alternative magnetic materials have been explored that might provide comparable saturation magnetizations with more flexible Curie temperatures. Previously explored materials include thin-film La1-xSrxMnO3 (LSMO) ceramics and powdered cobalt-rich metallic glasses. Flexibility in component material not only allows for tuning of operational frequency and Curie temperature, but also eases any material restriction requirements for undersea operations.

Another benefit of configuration of the magnetic components in a quasi-closed circuit configuration is that the available magnetic energy will be more concentrated within the vicinity of the ferromagnet, as illustrated by the small area of red and orange displayed in the finite element analysis output of FIGS. 13A and 13B. Such energy concentration acts not only to maximize the magnetic energy available for transduction, but also provides for a mechanism of magnetic shielding for the device. The ideal placement of the hot-side heat exchanger for the device would be in direct physical contact with the components to be cooled. In the event that such components might be sensitive to either the static DC magnetic field or to the small AC perturbations due to magnetization and demagnetization of the ferromagnetic material, such shielding will allow for a more intimate contact between the magnetothermal pump device heat exchanger and the device to be cooled.

Hot Side Hard Magnet Material Selection. Rare-earth NdFeCo hard magnets are currently among the best performers in terms of magnetic energy. Furthermore, NdFeCo magnets are much cheaper than other commercially available hard magnets, yielding a more economical material—both in terms of dollars per kilogram and in terms of Tesla per dollar. The main drawback with neodymium-based magnets as components of a miniaturized magnetothermal pump device lies in the permeance properties of the NdFeCo materials. While the operational temperature of the device is expected to be well below the Curie temperature of many of the commercially available hard magnets (e.g. NdFeB, AlNiCo, SmCo), temperature-induced demagnetization remains a potential risk. For example, an N42 NdFeCo disk magnet with a diameter of 9 mm and a length of 3 mm has a permeance coefficient of roughly 0.86. As such, the magnet will experience permanent demagnetization when the hot side temperature is raised above ~70° C.

Figures 14A, 14B:
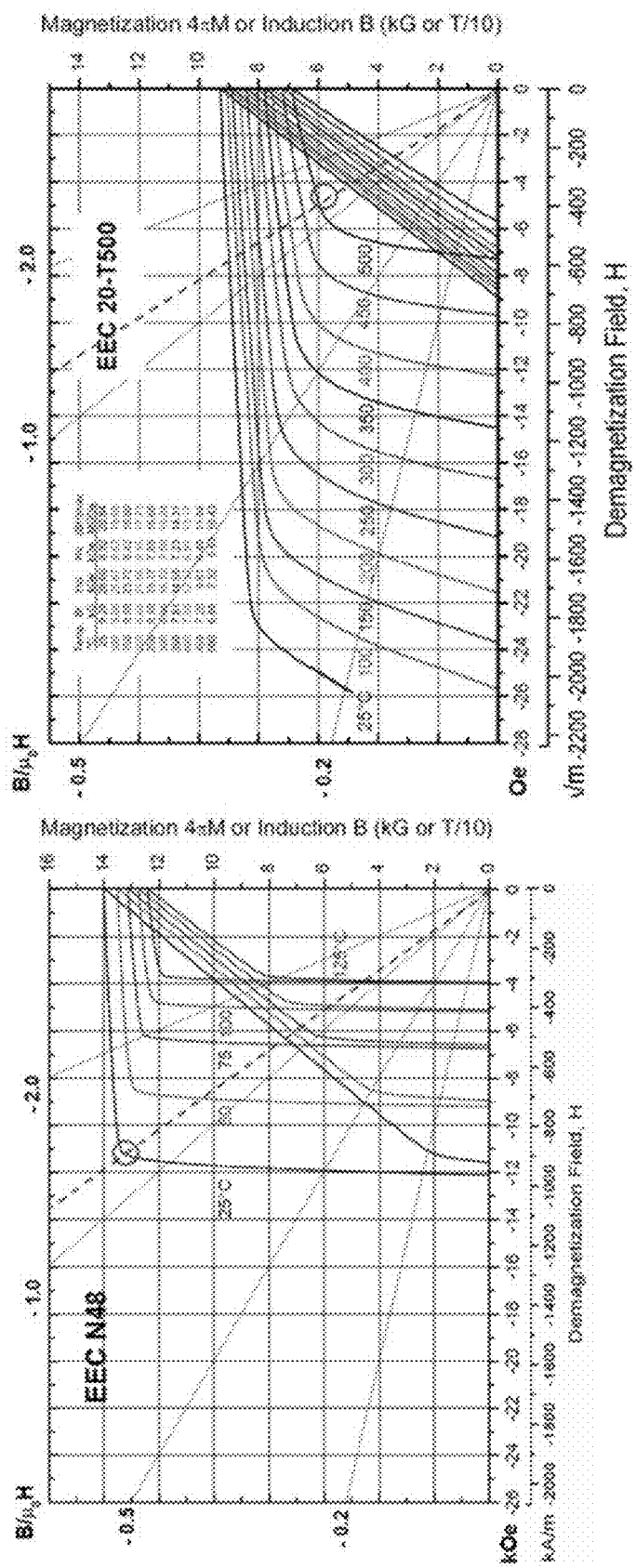
FIGS. 14A and 14B are graphs showing shape demagnetization curves for an N48 grade NdFeCo magnet (left) and an SmCo magnet (right).

At the further reduced scales, the permeance coefficient of the thin disk hard magnet of system embodiments of this disclosure is reduced by an order of magnitude, down to ~0.1. Even upon conversion of the system to a magnetic circuit configuration, the permeance coefficient lingers at a maximum of roughly 0.34. Any neodymium-based magnet of this geometry will start to show permanent demagnetization by roughly 25° C. This is shown in FIGS. 14A and 14B which shows shape demagnetization curves for an N48 grade NdFeCo magnet (left) and an SmCo magnet (right). Although SmCo magnets do not typical display the magnetic energy seen in NdFeCo materials, the degree of freedom afforded in the permanence of the materials increases the application space for SmCo-based hard magnetic materials (see D. D. L. Chung, "Thermal interface materials," Journal of Materials Engineering and Performance, vol. 10, no. 1, pp. 56-59, 2001). Although the hard magnet could potentially be remagnetized, such processes typically require annealing of samples in high magnetic fields.

Although slightly more expensive than and not quite as strong as NdFeCo (34 MGOe for SmCo versus 62 MGOe for NdFeCo), a miniaturized SmCo-based magnetic circuit drive will retain its strength for hot-side temperatures approaching 400° C. The loss in maximum magnetic energy of the material is therefore compensated by an enhanced demagnetization resistance, thereby increasing the application space in terms of maximum operational temperatures for low aspect ratio components. Furthermore, SmCo materials are not susceptible to oxidation or atmospheric degradation, increasing operational lifetimes and decreases implementation costs.

For particular applications, the magnetic materials, both the exact configuration of the magnetic circuit of the magnetothermal pump device, and the constituent materials of the hard and soft magnets can be designed according to desired specifications. In embodiments, the orientation and number of hot-side magnets, and the constituent materials should be engineered to provide for maximum magnetic force over the entire projected operational temperature range without permanent demagnetization effects.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

The invention claimed is:

1. A magnetothermal pump comprising:
   a first magnetic material capable of being disposed proximal to a heat source;
   a heat sink;
   a means for providing a restorative force;
   a second magnetic material disposed between said heat source and said heat sink and in operable communication with said means for providing a restorative force;
   optionally a conduit;
   optionally means for controlling directional flow;
   wherein said heat source and said heat sink together provide a thermal gradient comprising respectively a hot side and a cold side;
   wherein during operation said second magnetic material has a thermally induced magnetic transition point within or near temperatures included in said thermal gradient and oscillates between a closed position and an open position.

2. The pump of claim 1, wherein during operation said second magnetic material is capable of binding to said first magnetic material at temperatures below its magnetic transition point through an attractive magnetic force to achieve a closed position; and capable of unbinding to said first magnetic material at temperatures above its magnetic transition point through a restorative force provided by said means for providing a restorative force to achieve an open position; and said oscillation provides said mechanical energy for driving movement of said fluid through said conduit and said means for controlling directional flow in one direction.

3. The pump of claim 2, wherein movement of said fluid through said conduit occurs by providing for a fluid inlet on the hot side of the thermal gradient wherein said fluid:
   a. is capable of entering a space between the hot side and said second magnetic material when said second magnetic material is in said closed position;
   b. is capable of being further drawn into an additional void between said hot side and said second magnetic material that results when said second magnetic material shifts to said open position; and
   c. is capable of being expelled from said space through a fluid outlet when said second magnetic material shifts back to said closed position, wherein said fluid inlet and fluid outlet are in communication with said conduit.

4. The pump of claim 2, wherein movement of said fluid through said conduit occurs by providing for a fluid inlet on the cold side of the thermal gradient wherein said fluid:
   a. is capable of entering a space between said cold side and said second magnetic material when said second magnetic material is in said open position;
   b. is capable of being further drawn into an additional void between said second magnetic material and said cold side that results when said second magnetic material shifts to said closed position; and
   c. is capable of being expelled from said space through a fluid outlet when said second magnetic material shifts to said open position, wherein said fluid inlet and fluid outlet are in communication with said conduit.

5. The pump of claim 2, wherein movement of said fluid through said conduit occurs by providing for a fluid inlet on both the hot side and the cold side of the thermal gradient wherein said fluid is capable of:
   a. entering a space between said cold side and said second magnetic material when said second magnetic material is in said open position;
   b. being further drawn into an additional void between said second magnetic material and said cold side that results when said second magnetic material shifts to said closed position; and
   c. being expelled from said space through a fluid outlet when said second magnetic material shifts to said open position, wherein said fluid inlet and fluid outlet are in communication with said conduit; and
   d. being expelled from said space through a fluid outlet when said second magnetic material shifts back to said closed position, wherein said fluid inlet and fluid outlet are in communication with said conduit.

6. The pump of claim 1, wherein said second magnetic material is configured as a piston attached to a spring which serves as the means for providing a restorative force.

7. The pump of claim 6, wherein said piston and spring are configured inside a cylinder.

8. The pump of claim 1 comprising at least one reservoir for holding said fluid.

9. The pump of claim 1, wherein said first magnetic material comprises at least one hard magnet.

10. The pump of claim 1, wherein said second magnetic material comprises one or more of: (a) a ferromagnetic material, (b) exchange bias coupled materials comprising a ferromagnetic and an antiferromagnetic layer, (c) a material capable of exhibiting spin reorientation by way of antiferromagnetic coupling, (d) a material capable of a ferromagnetic-paramagnetic transition, (e) a material capable of an antiferromagnetic-to-paramagnetic Neel transition, or (f) a material capable of exhibiting a ferrimagnetic transition across magnetic compensation point.

11. A method of operating a magnetothermal pump, comprising:
   a. providing a thermal gradient comprising a hot side and a cold side;
   b. providing a first magnetic material disposed in operable communication with said hot side of said thermal gradient;
   c. suspending a second magnetic material within said gradient on a means for providing a restorative force, wherein said second magnetic material has a thermally-induced magnetic transition point; and d. oscillating the second magnetic material between a closed position and an open position within said thermal gradient.

12. The method of claim 11, wherein said oscillating comprises attracting said second magnetic material toward said first magnetic material at temperatures below a magnetic transition point of said second magnetic material by using an attractive magnetic force to achieve a closed position and wherein said oscillating comprises lessening attraction of said second magnetic material to said first magnetic material at temperatures above the magnetic transition point by using a restorative force provided by said means for providing a restorative force to achieve an open position.

13. The method of claim 12, wherein said oscillating provides mechanical energy which moves a fluid or a gas through a conduit.

14. The method of claim 13, wherein movement of said fluid or said gas through said conduit occurs by providing for a fluid inlet on the hot side of the thermal gradient wherein said fluid or gas: (i) enters a space between said hot side and said second magnetic material when said second magnetic material is in said closed position; (ii) is further drawn into an additional void between said hot side and said second magnetic material that results when said second magnetic material shifts to said open position; and (iii) is expelled from said space through a fluid outlet when said second magnetic material shifts back to said closed position, wherein said fluid inlet and said fluid outlet are in communication with said conduit.

15. The method of claim 13, wherein movement of said fluid or gas through said conduit occurs by providing for a fluid inlet on cold side of the thermal gradient wherein said fluid: (i) enters a space between said cold side and said second magnetic material when said second magnetic material is in said open position; (ii) is further drawn into an additional void between said second magnetic material and said cold side that results when said second magnetic material shifts to said closed position; and (iii) is expelled from said space through a fluid outlet when said second magnetic material e shifts to said open position, wherein said fluid inlet and said fluid outlet are in communication with said conduit.

16. The method of claim 13, wherein said conduit comprises a means for controlling directional flow.

17. The method of claim 16, wherein said means for controlling directional flow comprises any of or any combination of one-way mechanical valves, non-moving fluid diodes, or a system that provides asymmetric fluid pressure to inlets and outlets.

18. The method of claim 11, wherein said thermal gradient is provided by a heat source and a heat sink.

19. The method of claim 11, wherein said first magnetic material comprises a hard magnet.

20. The method of claim 11, wherein said second magnetic material comprises a ferromagnetic material.

* * * * *